US011117362B2

(12) United States Patent
van Tooren et al.

(10) Patent No.: US 11,117,362 B2
(45) Date of Patent: Sep. 14, 2021

(54) 3D PRINTED CONTINUOUS FIBER REINFORCED PART

(71) Applicants: TIGHITCO, Inc., North Charleston, SC (US); University of South Carolina, Columbia, SC (US)

(72) Inventors: Michael Johannes Leonardus van Tooren, Elgin, SC (US); Ramy Harik, Lexington, SC (US); Wout De Backer, Columbia, SC (US); Arturs Peteris Bergs, Cayce, SC (US); Tawne Louis Castorina, Coventry, CT (US)

(73) Assignees: TIGHITCO, Inc., North Charleston, SC (US); University of South Carolina, Columbia, SC (US)

( * ) Notice: Subject to any disclaimer, the term of this patent is extended or adjusted under 35 U.S.C. 154(b) by 559 days.

(21) Appl. No.: 15/936,558

(22) Filed: Mar. 27, 2018

(65) Prior Publication Data

US 2018/0356118 A1     Dec. 13, 2018

Related U.S. Application Data

(60) Provisional application No. 62/478,132, filed on Mar. 29, 2017.

(51) Int. Cl.
    *B32B 1/08*         (2006.01)
    *B33Y 80/00*      (2015.01)
    (Continued)

(52) U.S. Cl.
    CPC ............ *B33Y 80/00* (2014.12); *B29C 64/165* (2017.08); *B32B 1/08* (2013.01); *F24F 13/0218* (2013.01);
    (Continued)

(58) Field of Classification Search
    CPC ....... B32B 1/08; B32B 1/02; Y10T 428/1372; Y10T 428/139; Y10T 428/1352;
    (Continued)

(56) References Cited

U.S. PATENT DOCUMENTS

| 2,441,308 A | 5/1948 | Bond |
| 4,163,770 A | 8/1979 | Porosoff |

(Continued)

FOREIGN PATENT DOCUMENTS

| CN | 204431743 U | 7/2015 |
| CN | 106313496 A | 1/2017 |

(Continued)

OTHER PUBLICATIONS

Zhang et al.; Build Orientation Determination for Multi-material Deposition Additive Manufacturing with Continuous Fibers, ScienceDirect,26th CIRP Design Conference, Jun. 2016, entire document.

(Continued)

*Primary Examiner* — Walter Aughenbaugh
(74) *Attorney, Agent, or Firm* — Moore & Van Allen PLLC; W. Kevin Ransom

(57) ABSTRACT

A part includes a continuous fiber substantially encased in a formation material. The fiber and formation material are arranged in a plurality of alternating layers such that the formation material of a first one of the alternating layers adheres to the formation material of a second one of the alternating layers over the length of the continuous fiber. The part may include a thin-walled hollow member such as a duct. In some embodiments a part comprises a continuous fiber prepared by an additive manufacturing process comprising the steps of: depositing a composite material on a print bed using a print head, the composite material comprising a continuous fiber and a formation material in (Continued)

intimate contact with the continuous fiber; moving the print head and/or the print bed during the depositing of the composite material; and consolidating the composite material.

19 Claims, 9 Drawing Sheets

(51) Int. Cl.
  F24F 13/02      (2006.01)
  B29C 64/165     (2017.01)
  B33Y 10/00      (2015.01)
  B29L 23/00      (2006.01)
  B32B 1/02       (2006.01)

(52) U.S. Cl.
  CPC ...... *F24F 13/0245* (2013.01); *F24F 13/0281* (2013.01); *B29L 2023/22* (2013.01); *B32B 1/02* (2013.01); *B33Y 10/00* (2014.12); *Y10T 428/139* (2015.01); *Y10T 428/1352* (2015.01); *Y10T 428/1372* (2015.01)

(58) Field of Classification Search
  CPC ....... B29C 64/165; B33Y 10/00; B33Y 80/00; B33Y 70/00; B33Y 70/10
  See application file for complete search history.

(56) References Cited

U.S. PATENT DOCUMENTS

| | | | |
|---|---|---|---|
| 4,353,961 | A | 10/1982 | Gotcher et al. |
| 4,898,527 | A | 2/1990 | Claassen |
| 5,128,198 | A | 7/1992 | Dyksterhouse et al. |
| 5,268,133 | A | 12/1993 | Cuculo et al. |
| 5,470,647 | A | 11/1995 | Zimics et al. |
| 5,936,861 | A | 8/1999 | Jang et al. |
| 6,080,482 | A | 6/2000 | Martin et al. |
| 6,113,696 | A | 9/2000 | Tseng |
| 6,907,307 | B2 | 6/2005 | Chen et al. |
| 6,942,830 | B2 | 9/2005 | Mlhaupt et al. |
| 7,000,000 | B1 | 2/2006 | O'Brien |
| 7,122,246 | B2 | 10/2006 | Comb et al. |
| 8,226,395 | B2 | 7/2012 | Pax et al. |
| 8,778,252 | B2 | 7/2014 | Mackie et al. |
| 9,186,846 | B1 | 11/2015 | Mark et al. |
| 9,211,674 | B2 | 12/2015 | Van Tooren |
| 9,527,272 | B2 | 12/2016 | Steele |
| 9,539,762 | B2 | 1/2017 | Durand et al. |
| 9,745,452 | B2 | 8/2017 | Hwang et al. |
| 10,293,591 | B2 | 5/2019 | Nielsen-Cole et al. |
| 10,493,689 | B1 * | 12/2019 | Lyons ............... B29C 64/10 |
| 2008/0042321 | A1 | 2/2008 | Russell et al. |
| 2009/0014919 | A1 | 1/2009 | Rossfeldt et al. |
| 2009/0062426 | A1 | 3/2009 | Shiraki et al. |
| 2009/0273122 | A1 | 11/2009 | Batchelder et al. |
| 2010/0237531 | A1 | 9/2010 | Lyons et al. |
| 2010/0291304 | A1 | 11/2010 | Becker |
| 2014/0023812 | A1 | 1/2014 | Hammer et al. |
| 2014/0287139 | A1 | 9/2014 | Farmer et al. |
| 2014/0291886 | A1 | 10/2014 | Mark et al. |
| 2014/0309365 | A1 | 10/2014 | Beck et al. |
| 2014/0328963 | A1 | 11/2014 | Mark et al. |
| 2014/0328964 | A1 | 11/2014 | Mark et al. |
| 2015/0096717 | A1 | 4/2015 | Batchelder et al. |
| 2015/0108677 | A1 | 4/2015 | Mark et al. |
| 2015/0165666 | A1 | 6/2015 | Butcher et al. |
| 2015/0210007 | A1 | 7/2015 | Durand et al. |
| 2015/0251360 | A1 | 9/2015 | Steele |
| 2015/0290875 | A1 | 10/2015 | Mark et al. |
| 2015/0298393 | A1 | 10/2015 | Suarez |
| 2015/0314531 | A1 | 11/2015 | Mark et al. |
| 2015/0375457 | A1 | 12/2015 | Mark et al. |
| 2016/0009030 | A1 | 1/2016 | Mark et al. |
| 2016/0046082 | A1 | 2/2016 | Fuerstenberg |
| 2016/0176115 | A1 | 6/2016 | Becker |
| 2016/0177078 | A1 | 6/2016 | Naito et al. |
| 2016/0236408 | A1 | 8/2016 | Wolf et al. |
| 2016/0347009 | A1 | 12/2016 | Gaillard et al. |
| 2017/0028639 | A1 | 2/2017 | Evans et al. |
| 2017/0028644 | A1 | 2/2017 | Evans et al. |
| 2017/0036403 | A1 | 2/2017 | Ruff et al. |
| 2017/0037933 | A1 | 2/2017 | Takami et al. |
| 2017/0044337 | A1 | 2/2017 | Van Tooren et al. |
| 2017/0057167 | A1 | 3/2017 | van Tooren et al. |
| 2017/0106565 | A1 | 4/2017 | Braley et al. |
| 2017/0136707 | A1 | 5/2017 | Batchelder et al. |
| 2017/0245494 | A1 | 8/2017 | Bardosh et al. |
| 2017/0341301 | A1 | 11/2017 | Van Tooren et al. |
| 2017/0355142 | A1 | 12/2017 | Sterman et al. |
| 2018/0063895 | A1 | 3/2018 | Van Tooren et al. |
| 2018/0200955 | A1 | 7/2018 | Hoelldorfer et al. |
| 2019/0022935 | A1 | 1/2019 | Van Tooren et al. |
| 2020/0047402 | A1 | 2/2020 | De Backer et al. |
| 2021/0023774 | A1 | 1/2021 | Van Tooren et al. |

FOREIGN PATENT DOCUMENTS

| | | |
|---|---|---|
| DE | 10049473 A1 | 5/2001 |
| EP | 3341179 A1 | 7/2018 |
| EP | 3463818 A1 | 4/2019 |
| EP | 3468799 A1 | 4/2019 |
| EP | 3658355 A1 | 6/2020 |
| JP | S56161259 A | 12/1981 |
| KR | 20180040555 A | 4/2018 |
| KR | 20180055425 A | 5/2018 |
| WO | 2014153535 A2 | 9/2014 |
| WO | 2015073322 A1 | 5/2015 |
| WO | 2015077262 A1 | 5/2015 |
| WO | 2015107309 A1 | 7/2015 |
| WO | 2015112998 A1 | 7/2015 |
| WO | 2017035313 A1 | 3/2017 |
| WO | 2017205366 A1 | 11/2017 |
| WO | 2017210504 A1 | 12/2017 |
| WO | 2017218645 A1 | 12/2017 |
| WO | 2019023167 A1 | 1/2019 |
| WO | 2020036930 A1 | 2/2020 |
| WO | 2020185862 A1 | 9/2020 |

OTHER PUBLICATIONS

5Axisworks. "5AxisMaker" (2017).
Achillas, et al. "A methodological framework for the inclusion of modern additive manufacturing into the production portfolio of a focused factory" J. Manufact. Syst. 37 (2015) pp. 328-339.
Agassant, et al. "Polymer processing extrusion instabilities and methods for their elimination or minimisation" Int'l Polym. Proc. 21(3) (2006) pp. 239-255.
Ageorges, et al. "Fusion Bonding of Polymer Composites" (2002).
Ahn, et al. "Anisotropic material properties of fused deposition modeling ABS" Rapid Prototyp. J. 84(4) (2002) pp. 248-257.
Alexander, et al. "Part orientation and build cost determination in layered manufacturing" Comp.-Aided Des.30(5) (1998) pp. 343-356.
Alhaidri, M.A.M, "Characterization of carbon-fiber reinforced polyetherimide thermoplastic composites using mechanical and ultrasonic methods" U. Wisc.-Milw. (2014) pp. 1-84.
American Machinist. "The CAD/CAM hall of fame" http://americanmachinist.com/cadcam-software/cadcam-hall-fame (1998) pp. 1-3.
Antonov, et al. "Anisoprint: Revolutionary 3D printing technology" (2016). http://www.anisoprint.com.
Arevo Labs, "Robotic Additive Manufacturing Platform—RAMP" http://www.arevolabs.com (2015).
Assouli; et al., "Detection and identification of concrete cracking during corrosion of reinforced concrete by acoustic emission coupled to the electrochemical techniques," NDT&E International, 2005 38(8), pp. 682-689.
ASTM C 1260-07; "Standard Test Method for Potential Alkali Reactivity of Aggregate (Mortar-Bar Method)," American Society for Testing Materials, Philadelphia, 2007; 652-655 (5 pages).

(56) References Cited

OTHER PUBLICATIONS

ASTM C114-13; "Standard Test Methods for Chemical Analysis of Hydraulic Cement," American Society for Testing and Materials, 2013; 1-16; (3 pages—abstract only).

ASTM C1293; "Standard Test Method for Determination of Length Change of Concrete Due to Alkali-Silica Reaction," American Standard for Testing and Materials, 2008, 1-7; (2 pages—abstract only).

ASTM C138 / C138M-13a; "Standard Test Method for Density (Unit Weight), Yield, and Air Content (Gravimetric) of Concrete," American Society for Testing and Materials, 2013; 1-9; (2 pages—abstract only).

ASTM C157 / C157M-08; "Standard Test Method for Length Change of Hardened Hydraulic-Cement Mortar and Concrete," American Society for Testing and Materials, 2008; 1-5; (3 pages—abstract only).

ASTM C192 / C192M-13a; "Standard Practice for Making and Curing Concrete Test Specimens in the Laboratory," American Society for Testing and Materials, 2013; 7-20; (2 pages—abstract only).

ASTM C231 / C231M-10; "Standard Test Method for Air Content of Freshly Mixed Concrete by the Pressure Method," American Society for Testing and Materials, 2010; (10 pages).

ASTM C29 / C29M-09; "Standard Test Method for Bulk Density ("Unit Weight") and Voids in Aggregate," American Society for Testing and Materials, 2009; 1-13; (2 pages—abstract only).

ASTM E1316-06; "Standard Terminology for Nondestructive Examinations," American Society for Testing and Materials, 1-33 (2 pages—abstract only).

ASTM. "D3518—Standard test method for in-plane shear response of polymer matrix composite materials by tensile test of a +45° laminate" ASTM Int'l (2018) (pp. 1-7—abstract only).

Autodesk, "Inventor Professional 3D CAD Software" (2017), https://www.autodesk.com/Inventor.

Beckhoff, TwinCAT—PLC and Motion Control on the PC Beckhoff Automation Technology 3 (2016), https://www.beckhoff.com/twincat/.

Bellini, et al. "Mechanical characterization of parts fabricated using fused deposition modeling" Rapid Prototyp. J. 9 (2003) pp. 252-264.

Burtovy, et al., "Hydrophobic modification of polymer surfaces via "grafting to" approach." Journal of Macromolecular Science Part B: Physics, 46(1), (2007), pp. 137-154.

Byun, et al. "Determination of the optimal build direction for different rapid prototyping processes using multi-criterion decision making" Robotics and Computer-Integrated Manufacturing 22 (2006) pp. 69-80.

Canellidis, et al. "Efficient parts nesting schemes for improving stereolithography utilization" Comp.-Aided Des. 45 (2013) pp. 875-886.

Chacon, et al. "Integration of topology optimized designs into CAD/CAM via an IGES translator" Struct. Multidisc. Optim. 50(6) (2014) pp. 1115-1125.

Chakraborty, et al. "Extruder path generation for curved layer fused deposition modeling" Comp.-Aided Des. 40 (2008) pp. 235-243.

Cheng, et al. "Multi-objective optimization of part-building orientation in stereolithography" Rapid Prototyp. J. 1(4) (1995) pp. 12-23.

Choi, et al. "A multi-material virtual prototyping system" (2003) pp. 138-149.

Choi, et al. "A versatile virtual prototyping system for rapid product development" Computers in Industry 59 (2008) pp. 477-488.

Choi, et al. "A virtual prototyping system for rapid product development" Comp-Aided Des. 36 (2004) pp. 401-412.

Choset, et al. "Principles of robot motion: theory, algorithms, and implementation" MIT Press (2005).

Cicala, et al., "Engineering thermoplastics for additive manufacturing: a critical perspective with experimental evidence to support functional applications" J. Appl. Biomater. Funct. Mater. 15(1) (2017) pp. e10-e18.

Coetzee, G., Filament thickness sensors: What are they and what are they good for? Hackaday (2016) https://www.hackaday.com.

Conner, et al., "Making sense of 3-D printing: Creating a map of additive manufacturing products and services services" Add. Manufact. 1(4) (2014) pp. 64-76.

Creative Innovation Ltd. "Engineering Plastics" Innovation Group (2017), http://www.cil.co.th/engineering-plastics/.

Cupar, et al. "Shape verification of fused deposition modelling 3D prints" International Journal of Information and Computer Science 4 (2015) pp. 1-8.

Dassault Systemes, "Catia" V5-6R2014, https://www.3ds.com/products-services/catia.

Dassault Systemes, "Solidworks" https://www.solidworks.com.

De Backer, et al., "A framework for automated additive-subtractive manufacturing of multi-material composites" Proceedings of TMCE 20 (2016) pp. 317-328.

De Backer, et al., "Automated reconstruction of continuous robotic motion from G-code patterns patterns" Proc. CAD (2016) pp. 1-6.

Dealy, et al., "Melt rheology and its applications in the plastics industry," Engineering Materials and Processes (2013) pp. 1-292.

Ding, et al., "A practical path planning methodology for wire and arc additive manufacturing of thin-walled structures" Robot. Comp.-Integr. Manufact. 34 (2015) pp. 8-19.

Ding, et al., "Ch. 1—Advanced design for additive manufacturing: 3D slicing and 2D path planning" New Trends in 3D Printing (2016) pp. 3-23.

Doherty, et al. "Selective directional reinforcement of structures for multi-axis additive manufacturing" CAMX Conf. Proc. (2016) pp. 1-14.

Dolenc, et al. "Slicing procedures for layered manufacturing techniques" Comp.-Aided Des. 26(2), (1994) pp. 119-126.

Donald et al. "Kinodynamic motion planning" J. Assoc. Comp. Mach. 40(5) (1993) pp. 1048-1066.

Lange, et al. "Analysis of surface roughness using confocal microscopy" J. Mater. Sci. 28(14) (1993) pp. 3879-3884.

Lavalle, et al. "Rapidly-exploring random trees: Progress and prospects" Algor. Comp. Rob. (2000), 19 pages.

Lehong, et al. "Hype Cycle for Emerging Technologies, 2012" Gartner (2012) (Abstract only).

Li et al., "Fabrication of paper-based microfluidic sensors by printing." Colloids and Surfaces B: Biointerfaces 76(2), (2010), pp. 564-570.

Lin, et al."Automatic generation of NC cutter path from massive data points" Comp.-Aided Des. 30(1) (1998) pp. 77-90.

Liu, et al. "An approximation method to circular arcs" Appl. Math. Comp. 219(3) (2012) pp. 1306-1311.

Liu, et al., "Polymer Grafting via ATRP Initiated from Macroinitiator Synthesized on Surface" Langmuir 20, (2004), pp. 6710-6718.

Liu et al., "Synthesis of High-Density Grafted Polymer Layers with Thickness and Grafting Density Gradients" Langmuir 21, (2005), pp. 11806-11813.

Local Motors, "Local Motors Strati 3D Printed Car" Int 'l Manufact. Techn. Show (2014).

Luzinov et al. "Nanofabrication of thin polymer films," Nanothers and Nanotechnology in Textiles, Woodhead Publishing Ltd., 2007, pp. 448-469.

Luzinov, et al., "Responsive brush layers: from tailored gradients to reversibly assembled nanoparticles" Soft Matter 4, (2008), pp. 714-725.

Ma, et al. "NURBS-based adaptive slicing for efficient rapid prototyping" Comp.-Aided Des. 36 (2004) pp. 1309-1325.

Maker's Tool Works, "MendelMax 3" Maker's Tool Works, LLC (2015).

Mangual, et al. "Acoustic-Emission-Based Characterization of Corrosion Damage in Cracked Concrete with Prestressing Strand" ACI Mater. J. 110(1) (2013) pp. 89-98.

Manufacturing Institute, "Manufacturing's Multiplier Effect is Stronger than Other Sectors" (2014).

Markforged, "The Mark Two Desktop 3D Printer" MarkForged (2015).

Martinez et al., "Comparative between FEM models for FDM parts and their approach to a real mechanical behavior" Procedia Eng. 63 (2013) pp. 878-884.

(56) References Cited

OTHER PUBLICATIONS

Masood, et al., "A generic algorithm for a best part orientation system for complex parts in rapid prototyping" J. Mater. Proc. Techn. 139 (2003) pp. 110-116.
Mastercam, "Mastercam for Solidworks Solutions" CNC Software, Inc. www.mastercam.com.
Materialise, "Materialise Magics" http://www.materialise.com.
Matsuzaki, et al. "Three-dimensional printing of continuous-fiber composites by in-nozzle impregnation" Sci. Rep. 6:23058 (2016) pp. 1-7.
Matweb LLC, Database of Material Property Data http://www.matweb.com.
Miaris, et al. "Continuous impregnation of carbon-fibre rovings" JEC Comp. 56 (2010) 4 pages.
Molitch-Hou, M. "A new spin on 3D printing weaves objects without supports" engineering.com (2016) pp. 1-3.
Mori, et al. "Dieless forming of carbon fibre reinforced plastic parts using 3D printer" Procedia Eng. 81 (2014) pp. 1595-1600.
Moroni, et al. "Functionality-based part orientation for additive manufacturing" Procedia CIRP 36 (2015) pp. 217-222.
Neacsu, et al. "Spontaneous radial capillary impregnation across a bank of aligned micro-cylinders. Part I: Theory and model development" Int'l J. Multiph. Flow 32(6) (2006) pp. 661-676.
Neacsu, et al. "Spontaneous radial capillary impregnation across a bank of aligned micro-cylinders. Part II: Experimental investigations" Int'l J. Multiph. Flow 32(6) (2006) pp. 677-691.
Nelaturi, et al. "Representation and analysis of additively manufactured parts" Comp.-Aided Des. 67-68 (2015) pp. 13-23.
Ning, et al. "Additive manufacturing of carbon fiber-reinforced plastic composites using fused deposition modeling: Effects of process parameters on tensile properties" J. Comp. Mater. 51(4) (2016) pp. 451-462.
Nohara, et al. "Processing of high performance composites based on peek by aqueous suspension prepregging" Mater. Res. 13(2), (2010) pp. 245-252.
Novikov, et al. "Mataerial: A radically new 3D printing method" http://www.mataerial.com/.
Noztek. "Nortek xcalibur" 2018, https://www.nortek.com.
Offringa, et al., "Butt joined, Thermoplastic Stiffened-skin Concept Development," Sampe Journal 48(2), (2012), pp. 7-15.
Olhoff, et al. "On CAD-integrated structural topology and design optimization" Comp. Meth. Appl. Mech. Eng 89 (1991) pp. 259-279.
Owen-Hill, A., "What's the Difference Between Offline Programming and Simulation?" RoboDK Simulation and OLP for Robots (2017) pp. 1-5.
Padhye, et al. "Multi-objective optimisation and multi-criteria decision making in SLS using evolutionary approaches" Rapid Prototyp. J. 17(6) (2011), 30 pages.
Pandey, et al. "Real time adaptive slicing for fused deposition modelling" International Journal of Machine Tools & Manufacture 43 (2003) pp. 61-71.
Park, et al. "Tool path generation for a surface model with defects" Comp. Indust. 61(1) (2010) pp. 75-82.
Park, et al. "Tool-path generation from measured data" Comp.-Aided Des. 35(5) (2003) pp. 467-475.
Pham, et al. "A comparison of rapid prototyping technologies" Int'l J. Mach. Tools Manuf. 38 (1998) pp. 1257-1287.
Pham, et al. "Part orientation in stereolithography" Int'l J. Adv. Manuf. Techn. 15(9) (1999) pp. 674-682.
Ponche, et al. "Ch. 11—A new global approach to design for additive manufacturing" Additive Manufacturing Handbook (2012) pp. 170-186.
Popescu, et al. "Direct tool-path generation based on graph theory for milling roughing" Procedia CIRP 25 (2014) pp. 15-80.
Python Software Foundation. "Python 2.7" https://www.python.org.
Ramachandran, et al. "Mayavi: a package for 3D visualization of scientific data" IEEE Comp. Sci. Eng. 13(2) (2011) 11 pages.
Ren, et al. "Clean-up tool path generation by contraction tool method for machining complex polyhedral models" Comp. Ind. 54 (2004) pp. 17-33.
Repetier. "BoXZY Rapid-Change FabLab Firmware" https://www.Repetier.com.
Rieder, et al. "Online monitoring of additive manufacturing processes using ultrasound" Euro. Conf. Non-Destr. Test. (2014) pp. 1-8.
Roboris. "Eureka Virtual Machining" https://www.roboris.it.
Zdyrko, et al., "Polymer brushes as active nanolayers for tunable bacteria adhesion," Materials Science and Engineering C 29, (2009), pp. 680-684.
Zhang et al. "A Facet Cluster-based Method for Alternative Build Orientation Generation in Additive Manufacturing" Proc. Ann. Int'l Sol. Freeform Fabr. Symp. (2016) pp. 23-35.
Zhang, et al. "An integrated decision-making model for multi-attributes decision-making (MADM) problems in additive manufacturing process planning" Rapid Prototyp. J. 20(5) (2014) pp. 377-389.
Zhang et al., "Build Orientation Determination for Multi-material Deposition Additive Manufacturing with Continuous Fibers," Procedia CIRP (2016), pp. 1-6.
Zhang et al. "Build orientation optimization for multi-part production in additive manufacturing" J. Intell. Manufact. (2015) pp. 1-15.
Zhang, et al. "Evaluating the design for additive manufacturing: a process planning perspective" Procedia CIRP 21 (2014) pp. 144-150.
Zhang, et al. "Feature based building orientation optimization for additive manufacturing" Rapid Prototyp. J. 22(2) (2016) pp. 358-376. (Abstract only).
Zhang et al. "Using AM feature and multi-attribute decision making to orientate part in additive manufacturing" High Val. Manuf.: Adv. Res. Virt. Rap. Prototyp. (2013) pp. 411-416.
Zhong, et al. "Short fiber reinforced composites fused deposition modeling" Mater. Sci. Eng. A301 (2001) pp. 125-130.
Zhousan Howly Screw Co., Ltd. Available screw geometries. www.howlyscrew.com.
Chuang, et al. "Topology optimization of multi-material for the heat conduction problem based on the level set method" Eng. Optim. 42(9) (2010) pp. 811-831.
Ziehl: "Applications of Acoustic Emission Evaluation for Civil Infrastructure," SPIE Proc. SPIE Smart Structures NDE, San Diego, CA, 2008 (8 pages).
Ziemian, et al. "Tensile and fatigue behavior of layered acrylonitrile butadiene styrene" Rapid Prototyp. J. 21(3) (2015) pp. 270-278.
Zuo, et al. "A simple and compact Python code for complex 3D topology optimization" Adv. Eng. Softw. 85 (2015) pp. 1-11.
Draper, et al., "Mixed Polymer Brushes by Sequential Polymer Addition: Anchoring Layer Effect" Langmuir 20, (2004), pp. 4064-4075.
E3D-Online "The E3D V6 Hot End: Smaller, Easier, High Performance" https://www.E3D-online.com/E3D-V6.
Edie, et al., "Thermoplastic coating of carbon fibers" Clemson University NASA-CR-185047 (1989) pp. 1-136.
E-CFR. "Title 14—Aeronautics and Space" Office of Federal Register (2017) pp. 1-1399. https://ecfr.io/Title-14/ (Web only).
Elbatanouny, et al; "Corrosion Intensity Classification in Prestressed Concrete using Acoustic Emission Technique," Proc. American Society for Nondestructive Testing (ASNT) Fall Conference and Quality Testing Show 2011, Palm Springs, CA. Oct. 24-28, (9 pages).
Elbatanouny, et al; "Identification of Cracking Mechanisms in Scaled FRP Reinforced Concrete Beams using Acoustic Emission," Experimental Mechanics, DOI 10.1007/s11340-012-9692-3, Nov. 17 (online) 2012; 15 pages.
El-Dessouky, et al., "Ultra-lightweight carbon fibre/thermoplastic composite material using spread tow technology" Composites Part B: Eng. 50 (2013) pp. 91-97.
Filastruder, "Filastruder Kit and Filawinder Kit" https://www.filastruder.com.
Fitter, et al. "A review on approaches for handling Bezier curves in CAD for manufacturing" Procedia Eng. 97 (2014) pp. 1155-1166.

(56) References Cited

OTHER PUBLICATIONS

Frank, et al. "Expert system-based selection of the preferred direction of build for rapid prototyping processes" J. Intell. Manufact. 6(5) (1995) pp. 339-345. (Preview Abstract only).
Gao, et al. "The status, challenges, and future of additive manufacturing in engineering" Comp.-Aided Des. 69 (2015) pp. 65-89.
Gardner, et al. "High temperature thermoplastic additive manufacturing using low-cost, open-source hardware" NASA Langley Research Center NASA/TM-2016-219344 (2016) pp. 1-15.
GE Plastics, "Ultem PEI Resin Product Guide" GE Engineering Thermoplastics (2015) pp. 1-52.
Geraerts, et al., "A comparative study of probabilistic roadmap planners" Algor. Found. Robotics V (2004) pp. 43-58.
Gibson, et al., "Sheet Lamination Processes" Additive Manufacturing Technologies (2010) pp. 207-236.
Giles, et al., "Extrusion: The definitive processing guide and handbook" William Andrew, Inc. (2004) pp. 1-560.
Giraud, et al., "Preparation of aqueous dispersion of thermoplastic sizing agent for carbon fiber by emulsion/solvent evaporation" Appl. Surf. Sci. 266 (2013) pp. 94-99.
Grutle, O.K. "5-axis 3D Printer" U. Oslo (2015) pp. 1-114.
Guo, B. "Surface reconstruction: From points to splines" Comp.-Aided Des. 9(4) (1997) pp. 269-277.
Hart, et al. "A formal basis for the heuristic determination of minimum cost paths" IEEE Trans. Sys. Sci. Cyber. 4(2) (1968) pp. 100-107.
Hayes, et al., "Optical microscopy of fiber-reinforced composites" 05303G ASM Int'l. (2010) pp. 1-9.
Henton, et al. "Ch. 16—Polyactic Acid Technology" Nat. Fibers Biopolym. Biocomp. (2005) pp. 527-577.
Hexcel, "Hextow AS4 Carbon Fiber Datasheet" Hexcel Corp. (2018) pp. 1-2.
Hopmann, et al., "Extrusion dies for plastics and rubber: Design and engineering computations" Hanser Verlag (2003).
Hou, et al., "Manufacture of a carbon-fabric-reinforced polyetherimide (CF/PEI) composite material" Comp. Sci. Techn. 58(2) (1998) pp. 181-190.
Huang, et al. Evolutionary topology optimization of continuum structures with an additional displacement constraint, Struct Multidisc Optim (2010) vol. 40, pp. 409-416.
Idrissi, et al; "Study and characterization by acoustic emission and electrochemical measurements of concrete deterioration caused by reinforcement steel corrosion," NDT&E International, 2003; 36(8), pp. 563-569.
Impossible Objects. "Composite-Based Additive Manufacturing (CBAM) Technology" Imposs. Obj. (2017).
Invernizzi, et al. "UV-assisted 3D printing of glass and carbon fiber-reinforced dual-cure polymer composites" Materials 9(7):583 (2016) pp. 1-12.
Iyer, et al., "Polystyrene Layers Grafted to Macromolecular Anchoring Layer." Macromolecules 36, (2003), pp. 6519-6526.
Izumi International. Composite products. Https://www.izumiinternational.com.
Jamieson, et al. "Direct slicing of CAD models for rapid prototyping" Rapid Prototyp. J. 1 (1995) pp. 4-12.
Jia, et al. "Research on the melt impregnation of continuous carbon fiber reinforced nylon 66 composites" IOP Conf. Ser.: Mater. S. Eng. 137:012053 (2016) pp. 1-14.
Kassapoglou, C. "Design and Analysis of Composite Structures with Application to Aerospace Structures" Aerospace Series (2010).
Kavraki, et al. "Probabilistic roadmaps for path planning in high-dimensional configuration spaces" IEEE Trans. Robot. Autom. 12(4) (1996) pp. 566-580.
Kerbrat, et al. "Manufacturability analysis to combine additive and subtractive processes" Rapid Prototyp. J. 16(1) (2010) pp. 63-72.
Kim, et al. "Tool path generation for clean-up machining by a curve-based approach" Comp.-Aided Des. 37(9) (2005) pp. 967-973.
Koc, et al. "Adaptive ruled layers approximation of STL models and multi-axis machining applications of rapid prototyping" J. Manuf. Sys. 21 (2002) pp. 153-166.
Kruth, et al. "Progress in additive manufacturing and rapid prototyping" Annuals of CIRP 47(2) (1998) pp. 525-540.
KUKA AG. "Industrial Robotics_Small Robots" KUKA Robotics Corporation (2018).
KUKA AG. "Kuka.OfficeLite" KUKA Robotics Corporation (2017).
KUKA AG. "Kuka.Sim" KM Robotics Corporation Ver. 2.2 (2016).
KUKA AG. "Kuka.WorkVisual." KUKA Robotics Corporation Ver. 3.2-4.1 (2014).
KUKA AG. "Roboter GmbH Controller: KR AGILUS sixx WP with W and C Variants Specification" KUKA Robotics Corporation (2015) pp. 1-133.
KUKA AG. "Roboter GmbH Controller: KR C4 Operating Instructions" KUKA Robotics Corporation (2012) pp. 1-183.
Kulkarni, et al. "A review of process planning techniques in layered manufacturing" Rapid Prototyp. J. 6(1) (2000) pp. 18-35.
Kulkarni, et al. "An accurate slicing procedure for layered manufacturing" Comp.-Aided Des. 28 (1996) pp. 683-697.
Kulkarni, et al. "Deposition strategies and resulting part stiffnesses in fused deposition modeling" J. Manuf. Sci. Eng. 121(1) (1999) pp. 93-103.
Kumar, et al. "Representation and processing of heterogeneous objects for solid freeform fabrication" Geom. Model. Worksh. WG5.2 (1998) pp. 1-21.
Lampton, M., "Rotation Sequences and Euler Angles" (1993) pp. 1-7.
Rosen, D.W. "Computer-aided design for additive manufacturing of cellular structures" Camp-Aided Des. Appl. 4(5) (2013) pp. 585-594.
Russell, et al. "America makes: The National Additive Manufacturing Innovation Institute (NAMII) Status Report and Future Opportunities" SAMPE J. 50 (2014) pp. 62-65.
Sabic. "ULTEM Resin 1000" (2015).
Sabic. "ULTEM Resin 9085" (2015).
Sanchez, et al. "A single-query bi-directional probabilistic roadmap planner with lazy collision checking" Robot. Res. (2003) pp. 403-417.
Sellamani, et al. "PCS: Prominent cross-sections for mesh models" Comp.-Aided Des. Appl. 7(4) (2010) pp. 601-620.
Shi, et al. "Manufacturability analysis for additive manufacturing using a novel feature recongition technique" Comp.-Aided Des. Appl. 15(6), 2018, pp. 941-952.
Simplify3D. "Simplify3D 3D Printing Slicing Software" (2017) pp. 1-5.
Singamneni, et al. "Curved-layer fused deposition modelling" J. New Gener. Sci. 8(2) (2010) pp. 95-107.
Singamneni, et al. "Modeling and evaluation of curved layer fused deposition" J. Mater. Proc. Tech. 212 (2012) pp. 27-35.
Sinotech, Inc., Injection molded parts, process and equipment. https://www.sinotech.com.
SLIC3R. "Slic3r g-code generator for 3D printers" http://www.slic3r.org.
Smith, et al. "Structural characteristics of fused deposition modeling polycarbonate material" Polym. Test. 32 (2013) pp. 1306-1312.
Sobieszczanski-Sobieski, et al. "Multidisciplinary aerospace design optimization: Survey of recent developments" Struct. Optim. 14 (1997) pp. 1-23.
Stentz, A. "Optimal and efficient path planning for partially-known environments" Proc. IEEE Int'l Conf. Robot. Autom. (1994) pp. 3310-3317.
Stevenson, K. "Can ENOMOTO's Experimental 5-Axis 3D Printer Hybrid Do the Impossible?" Fabbaloo (2016) pp. 1-2.
Stratasys. 3D printing and additive manufacturing. http://www.stratasys.com.
Subrahmanyam, et al. "An overview of automatic feature recognition techniques for computer-aided process planning" Comp. Indust. 26 (1995) pp. 1-21.
Sugavaneswaran, et al. "Analytical and experimental investigation on elastic modulus of reinforced additive manufactured structures" Materials and Design 66 (2015) pp. 29-36.

(56) References Cited

OTHER PUBLICATIONS

Sutherland, S.E., "Sketchpad, A man-machine graphical communication system" Mass. Instit. Techn. (1963) pp. 1-177.
Swamy; "The Alkali-Silica Reaction in Concrete" New York Blackie and Son Ltd.; 1992; (348 pages).
Talagani et al. "Numerical simulation of big area additive manufacturing (3D printing) of a full size car" SAMPE J. 51 (4) (2015) pp. 27-34.
Tang, et al. "A review of methods for improving the interfacial adhesion between carbon fiber and polymer matrix" Polym. Comp. 18(1) (1997) pp. 100-113.
Tang, et al. "Integration of topology and shape optimization for design of structural components" Struct. Multidiscipl. Optim. 22 (2001) pp. 65-82.
Taylor, et al. "Inkjet printing of carbon supported platinum 3-D catalyst layers for use in fuel cells" J. Power Sources 171(1) (2007) pp. 101-106.
Tencate. "Toray Cetex TC1000 Premium PEI" Toray Advanced Composites (2017) pp. 1-4.
Tuttle, et al. "Feature recognition for NC part programming" Comp. Indust. 35(3) (1998) pp. 275-289.
Ullman, D.G. "The Mechanical Design Process", Fourth Edition, McGraw-Hill (2010) 443 pages.
Ultimaker. "Cura 3D Printing Slicing Software" Ver. 2.5. (2017) pp. 1-2.
Van Haste, F. "Stop black specks!" Plastics Technology (2007) pp. 1-3.
Varady, et al. "Special issue: Reverse engineering of geometric models" Comp.-Aided Des. 29(4) (1997) pp. 253-268.
Vega, et al. "The effect of layer orientation on the mechanical properties and microstructure of a polymer" J. Mater. Eng. Pert. 20(6) (2011) pp. 978-988.
Velez-Garcia, et al., "Sample preparation and image acquisition using optical-reflective microscopy in the measurement of fiber orientation in thermoplastic composites" J. Micro. 248(1) (2012) pp. 23-33.
Vlachopoulos, et al. "The role of rheology in polymer extrusion" New Techn. Extrus. Conf. (2003) pp. 1-25.
Wang, et al. "A model research for prototype warp deformation in the FDM process" Int'l J. Adv. Manuf. Tech. 33 (2007) pp. 1087-1096.
Weiss, et al. "Low-cost closed-loop control of a 3D printer gantry" Rapid Prototyp. J. 21(5) (2015) pp. 482-490.
West, D.M., "What happens if robots take the jobs? The impact of emerging technologies on employment and public policy" Centre Techn. Innov. Brookings (2015) pp. 1-22.
West, et al. "A process planning method for improving build performance in stereolithography" Comp.-Aided Des. 33 (2001) pp. 65-79.
Wheeler, A. "GE Aviation's First 3D Printed Engine Component for the GE 90 Engine" engineering.com (2015) pp. 1-2.
Wohlers, et al. "Wohlers Report 2016: History of additive manufacturing" Wohlers Associates, Inc. (2016) pp. 1-38.
Wong, et al. "A review of additive manufacturing" ISRN Mech. Eng. 2012:208760 (2012) pp. 1-10.
Wu, et al. "Analysis on machined feature recognition techniques based on B-rep" Comp.-Aided Des. 28 (1996) pp. 603-616.
Wu, et al. "Implementation of CL points preprocessing methodology with NURBS curve fitting technique for high-speed machining" Comp. Indust. Eng. 81 (2015) pp. 58-64.
Xu, et al. "Considerations and selection of optimal orientation for different rapid prototyping systems" Rapid Prototyp. J. 5(2) (1999) pp. 54-60. (Abstract only).
Xue, et al. "Mechanistic Fatigue Modeling for Continuous Fiber-Reinforced Polymer Matrix Composites" Int'l SAMPE Tech. Conf. (2013) pp. 801-812. (Abstract only).
Yan, et al. "A review of rapid prototyping technologies and systems" Comp.-Aided Des. 28(4) (1996) pp. 307-318.
Young, W.B. "Capillary impregnation into cylinder banks" J. Coll. Interf. Sci. 273 (2004) pp. 576-580.
Zdyrko, et al. "Synthesis and Surface Morphology of High-Density Poly(ethylene glycol) Grafted Layers" Langmuir 19(24) (2003) pp. 10179-10187.
Zdyrko, et al., "Nano-patterning with polymer brushes via solvent-assisted polymer grafting," Soft Matter 4, (2008), pp. 2213-2219.
Zdyrko, et al., "Polymer Brushes by the "Grafting to" Method." Macromolecular Rapid Communications 32(12), (2011), pp. 859-869.

* cited by examiner

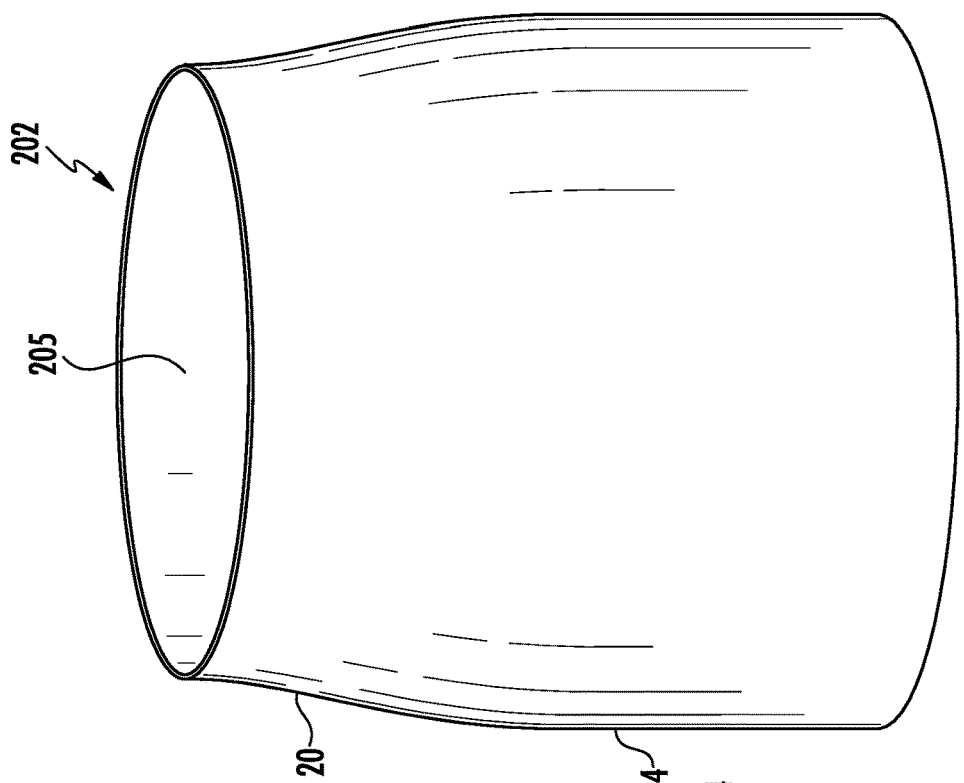
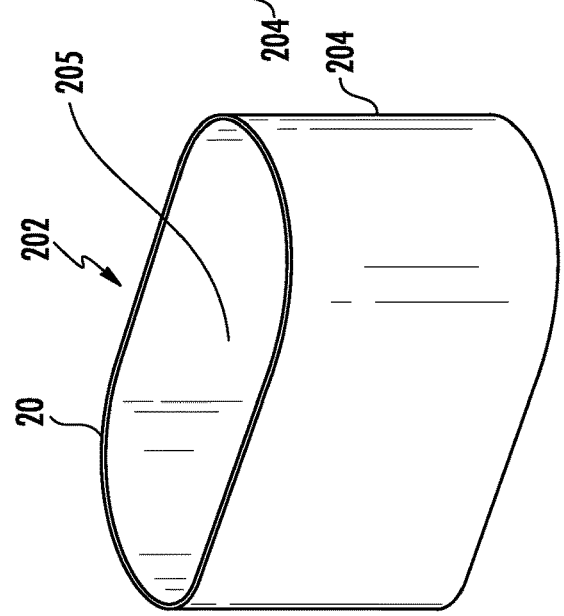
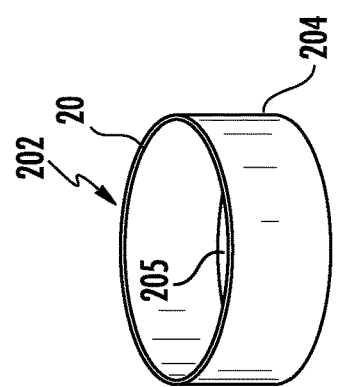

3D PRINTED CONTINUOUS FIBER REINFORCED PART

CROSS-REFERENCE TO RELATED APPLICATION(S)

This application is a non-provisional of and claims priority to U.S. Provisional Application No. 62/478,132 filed on Mar. 29, 2017, of the same title, the contents of which are also incorporated herein by reference.

FIELD OF THE INVENTION

The present invention, in general, relates to a fiber reinforced part formed via an additive manufacturing process.

BACKGROUND OF THE INVENTION

Additive manufacturing refers to any method for forming a three-dimensional ("3D") object in which successive layers of material are laid down according to a controlled deposition and solidification process. The main differences between additive manufacturing processes are the types of materials to be deposited and the way the materials are deposited and solidified. Fused deposition modeling (also commonly referred to as 3D printing) extrudes materials including liquids (e.g., polymeric melts or gels) and extrudable solids (e.g., clays or ceramics) to produce a layer, followed by spontaneous or controlled curing of the extrudate in the desired pattern of the structure layer. Other additive manufacturing processes deposit solids in the form of powders or thin films, followed by the application of energy and/or binders often in a focused pattern to join the deposited solids and form a single, solid structure having the desired shape. Generally, each layer is individually treated to solidify the deposited material prior to deposition of the succeeding layer, with each successive layer becoming adhered to the previous layer during the solidification process. While additive manufacturing technologies have become much more common and less expensive in recent years, the technology is primarily limited to formation of prototypes, as the formed materials generally exhibit low strength characteristics.

An object manufactured by an additive manufacturing process that has high strength characteristics is desired.

SUMMARY OF THE INVENTION

In some embodiments a part comprises a continuous fiber substantially encased in a formation material. The fiber and formation material are arranged in a plurality of alternating layers such that the formation material of a first one of the alternating layers adheres to the formation material of a second one of the alternating layers over the length of the continuous fiber.

The part may include a thin-walled hollow member such as a duct or a container, either fully or partially enclosed. The continuous fiber extends uninterrupted or substantially uninterrupted for the length of the reinforced part.

In some embodiments, the part is a duct which includes a thin reinforced wall having a first end and a second end and defining a hollow interior. The reinforced wall comprises a continuous fiber extending from the first end to the second end substantially encased in a formation material. The fiber and formation material are arranged in a plurality of alternating layers such that the formation material of a first one of the alternating layers adheres to the formation material of a second one of the alternating layers over the length of the continuous fiber. The duct may include a non-reinforced portion formed of material that does not include a reinforcement fiber and/or a partially non-reinforced portion that includes portions that include a reinforced fiber and portions where such a fiber is absent.

In some embodiments a part comprising a continuous fiber prepared by an additive manufacturing process comprising the steps of: depositing a composite material on a print bed using a print head, the composite material comprising a continuous fiber and a formation material in intimate contact with the continuous fiber; moving the print head and/or the print bed during the depositing of the composite material; and consolidating the composite material.

BRIEF DESCRIPTION OF THE DRAWINGS

FIGS. 5, 6 and 7 are perspective views of exemplary embodiments of a 3D printed fiber reinforced part.

DETAILED DESCRIPTION OF THE INVENTION

Reference now will be made to the embodiments of the invention, one or more examples of which are set forth below. It will be apparent to those skilled in the art that various modifications and variations can be made in the invention without departing from the scope or spirit of the invention. For instance, features illustrated or described as one embodiment can be used on another embodiment to yield still a further embodiment.

The 3D printer as shown and described herein allows for printing of high strength composite parts with continuous fibers or filaments in multiple directions and orientations. The term "fiber" as used herein includes the composite filament described herein and means any continuous elongated piece of material that may be used to reinforce a high strength composite part as described herein.

Figure 1A:
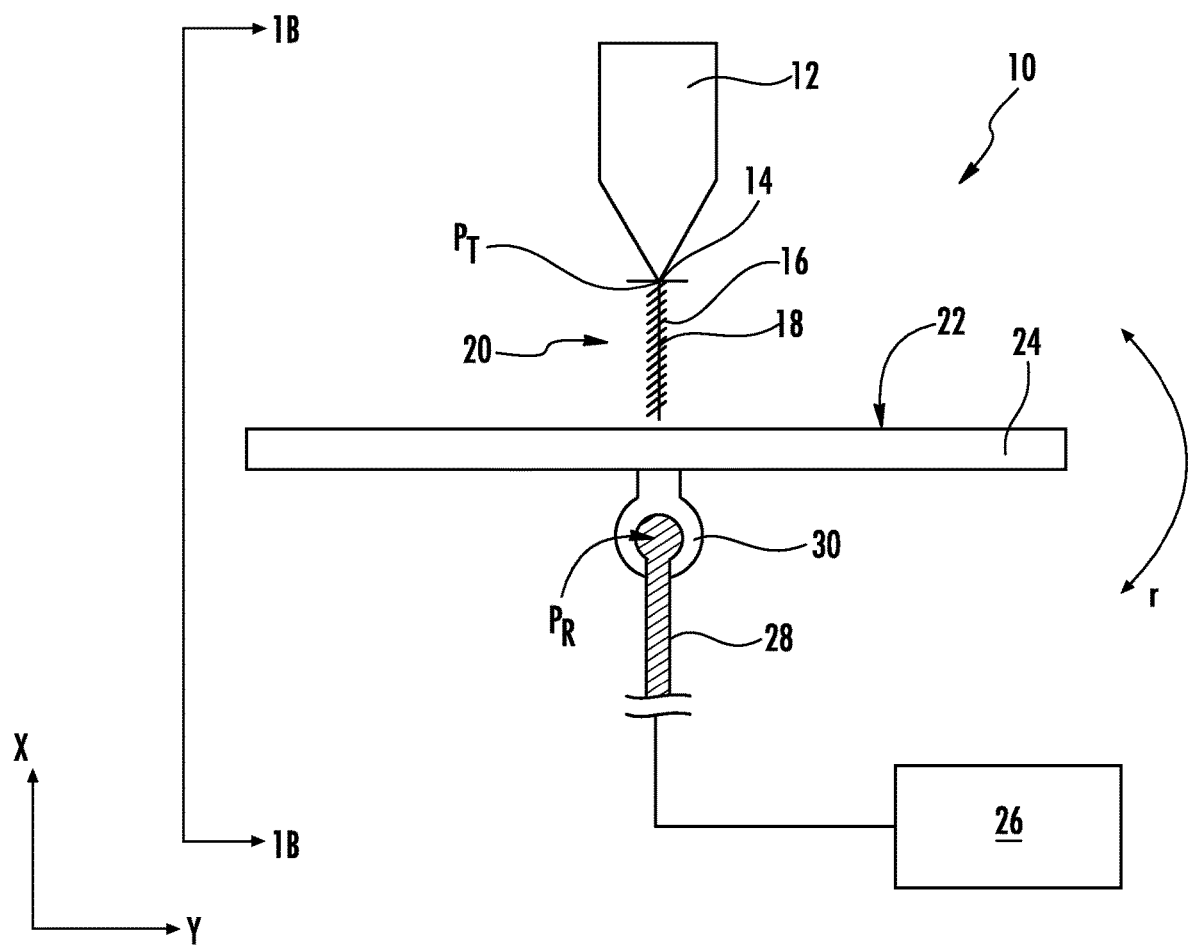
FIG. 1A shows a front view of an exemplary system having a print bed with 6 degrees of movement.
Figure 1B:
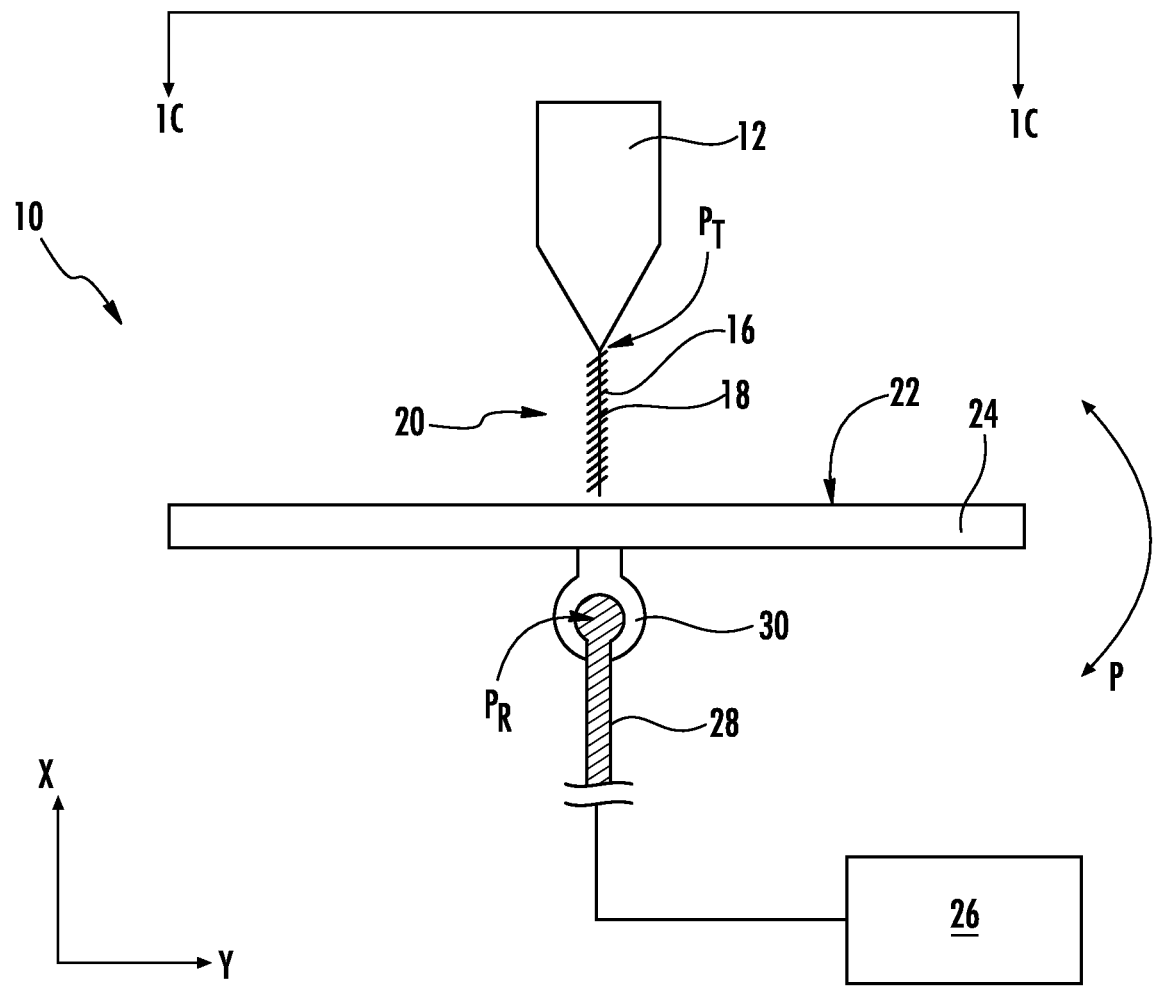
FIG. 1B shows a side view of the exemplary system of FIG. 1A.
Figure 1C:
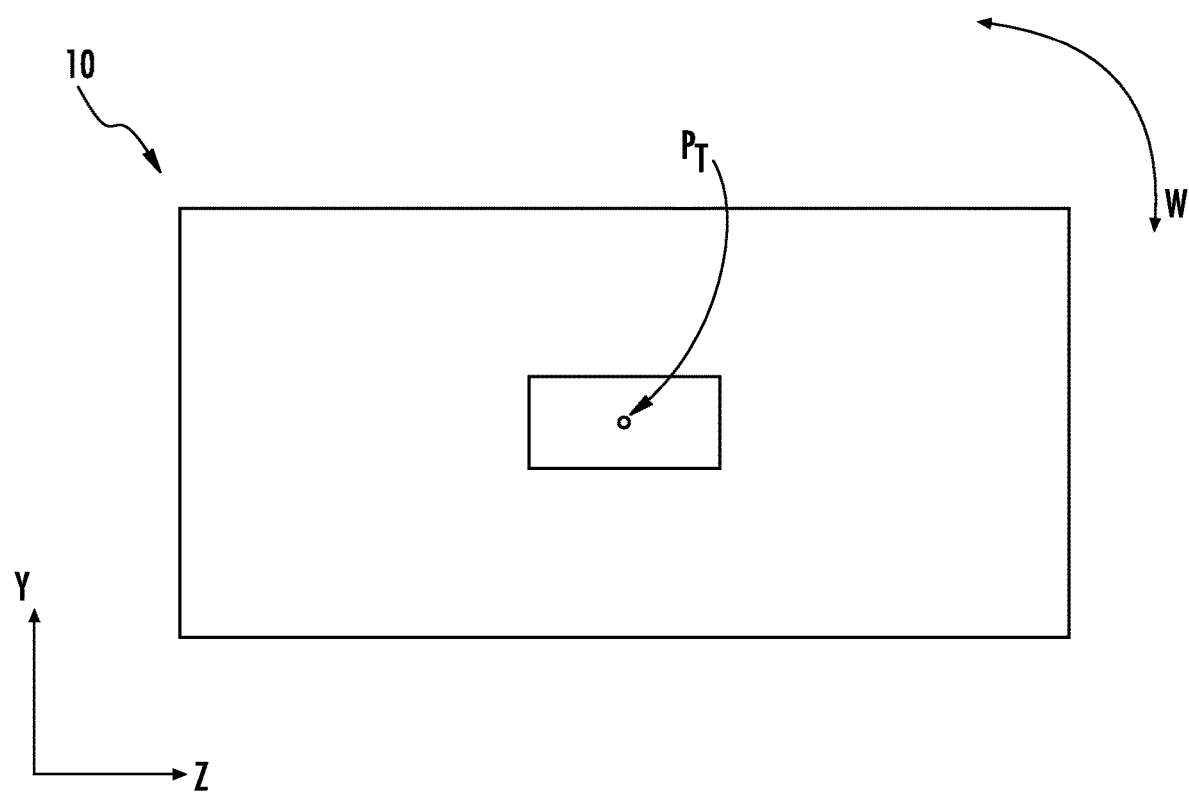
FIG. 1C shows a top view of the exemplary system of FIG. 1A.

FIGS. 1A-1C shows an exemplary system 10 including a nozzle or print head 12 having an extrusion tip 14 defining a translational point PT. The nozzle 12 combines a formation material 16 and a continuous fiber 18 to form a composite material 20. During printing, the composite material 20 is deposited onto the printing surface 22 of the print bed 24 and/or a mandrel located on the printing surface 22 (where the mandrel acts as a structural form to which the composite material is applied), and/or an existing work piece. The print bed 24 is moveable, independently with 6 degrees of freedom, as controlled by the controller 26. As will be discussed later, the movement/orientation of an optional mandrel 32 (FIG. 1D) may also be controlled relative to the print bed to provide added degrees of freedom for further complex printing.

The print bed 24 is moveable in the x-direction (i.e., up/down with respect to the translational point PT), in the y-direction (i.e., laterally with respect to the translational point PT), and z-direction (i.e., cross-laterally with respect to the translational point PT). The print bed 24 can be moved translational, independently, by controller 26 using the arm 28 connected to the receiver 30 of the print bed 24. In particular embodiments, the arm 28 can be formed from multiple segments connected together at moveable joints (bending and/or rotating) to allow for translational movement of the print bed 24 with respect to the translation point PT.

Additionally, the print bed 24 is rotationally movable about the rotational point PR to allow roll (r), pitch (p), and yaw (w) rotational movement. The print bed 24 can be rotated in any direction, independently, by controller 26 using the arm 28 connected to the receiver 30 of the print bed 24. Although shown as utilizing a rotation ball 29 coupled to the receiver 30, any suitable connection can be utilized.

Figure 1D:
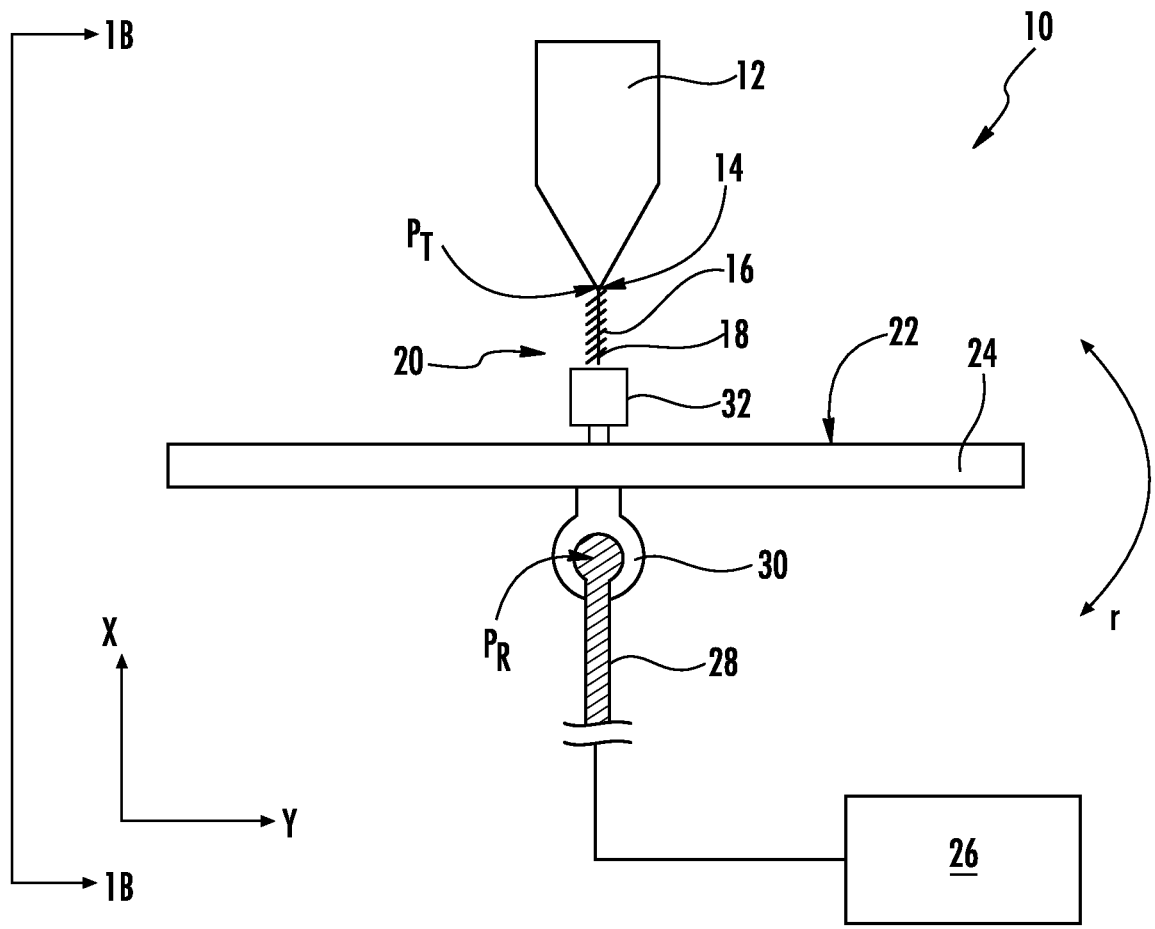
FIG. 1D shows a side view of a prototype set-up employing a mandrel connected with the print bed.

As shown in FIG. 1D, in some embodiments, a mandrel 32 may be applied to the printing surface 22 of the print bed 24. The mandrel 32 may act as a structural form to which the fiber(s) and/or composite materials are applied to form the work piece. In some embodiments, the mandrel 32 may be applied in a stationary manner to the printing surface and move with the print bed 24 of the printer. In some embodiments, the mandrel may be applied to a second printing surface or positioned on a moveable arm that is separate from the print bed 24, so that the mandrel is moveable relative to the print bed 24 to create further degrees of freedom beyond the six degrees of freedom achieved via the movable print bed. Alternatively, added degrees of freedom could be achieved via use of multiple print beds that are each movable in six degrees of freedom relative to the base print bed 24, whereby controlled orientation of the base print bed 24 and controlled orientation of the added print beds creates further degrees of freedom.

In one embodiment, the controller 26 may comprise a computer or other suitable processing unit. Thus, in several embodiments, the controller 26 may include suitable computer-readable instructions that, when implemented, configure the controller 26 to perform various different functions, such as receiving, transmitting and/or executing arm movement control signals.

A computer generally includes a processor(s) and a memory. The processor(s) can be any known processing device. Memory can include any suitable computer-readable medium or media, including, but not limited to, RAM, ROM, hard drives, flash drives, or other memory devices. The memory can be non-transitory. Memory stores information accessible by processor(s), including instructions that can be executed by processor(s). The instructions can be any set of instructions that when executed by the processor(s), cause the processor(s) to provide desired functionality. For instance, the instructions can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits. Memory can also include data that may be retrieved, manipulated, or stored by processor(s).

The computing device can include a network interface for accessing information over a network. The network can include a combination of networks, such as Wi-Fi network, LAN, WAN, the Internet, cellular network, and/or other suitable network and can include any number of wired or wireless communication links. For instance, computing device could communicate through a wired or wireless network with the arm 28, the rotation ball 29, and/or the nozzle 12.

In one embodiment, the printer can include multiple nozzles or print heads. For example, a nozzle can be included to print wax-like material to support the formation material during the printing process.

In one particular embodiment, the controller 26 can include (or be in communication with a computer that includes) supporting software programs that can include, for example, computer aided design (CAD) software and additive manufacturing layering software as are known in the art. The controller 26 can operate via the software to create a three-dimensional drawing of a desired structure and/or to convert the drawing into multiple elevation layer data. For instance, the design of a three-dimensional structure can be provided to the computer utilizing commercially available CAD software. The structure design can then be sectioned into multiple layers by commercially available layering software. Each layer can have a unique shape and dimension. The layers, following formation, can reproduce the complete shape of the desired structure.

For example, the printer can be accompanied with software to slice beyond the current xyz slicing methodology used in industry. For example, 3D objects other than 3D Cartesian objects, such as a iso-parametric helically/spirally winded band around a duct, can be spirally sliced instead of sliced in a flat plane, to be able to spirally lay-down/print filament and/or slit tape/tow. Thus, the iso-parametrical slicing can be utilized with printing capability of the 6 degrees of freedom.

In a traditional 3D printing system, the layer files are translated to print head movements for applying material to a print bed to form the work piece. In the print system provided herein, the layer files are also translated to print bed and/or mandrel movements to create the various layers and continuous thread patterns discussed herein via movement of the print head and/or the mandrel.

Numerous software programs have become available that are capable of performing the presently specified functions. For example, AUTOLISP can be used to convert AUTOCAD drawings into multiple layers of specific patterns and dimensions. CGI (Capture Geometry Inside, currently located at 15161 Technology Drive, Minneapolis, Minn.) also can provide capabilities of digitizing complete geometry of a three-dimensional object and creating multiple-layer data files. The controller 26 can be electronically linked to mechanical drive means so as to actuate the mechanical drive means in response to "x," "y," and "z" axis drive signals and "p," "r," and "w," rotation signals, respectively, for each layer as received from the controller 26.

As stated, the composite material 20 includes a formation material 16 and a continuous fiber 18. The continuous fiber 18 is discharged in conjunction with the formation material 16 such that the continuous fiber 18 is at least partially encased within the formation material 16 to form the composite material 20, as shown. In some embodiments the continuous fiber 18 is completely encased in the formation material 16. The formation material 16 can be a metal, a polymeric material, etc. that is fed to the nozzle 12 and is heated above the melting temperature of the material to soften and/or liquefy so as to flow through the extrusion tip 14 and form a partial or continuous coating on the continuous fiber 18, such that the formation material bonds with the outer surface of the continuous fiber.

The formation material 16 can be, for example, a gel, a high viscosity liquid, or a formable solid that can be extruded in the desired pattern. Formation materials likewise can be organic or inorganic. Formation materials can include, without limitation, polymers including thermoplastic polymers or thermoset polymers (e.g., polyolefins, polystyrenes, polyvinyl chloride, elastomeric thermoplastics, polycarbonates, polyamides, etc.), eutectic metal alloy melts, clays, ceramics, silicone rubbers, and so forth. Blends of materials can also be utilized as the formation materials, e.g., polymer blends. The formation materials can include additives as are generally known in the art such as, without limitation, dyes or colorants, flow modifiers, stabilizers, nucleators, flame retardants, and so forth.

The formation material is combined with a high strength continuous fiber(s) 18 prior to or during formation of the layer. The high strength continuous fibers can be utilized as individual fibers or as bundles of fibers, e.g., a roving. As used herein, the term "roving" generally refers to a bundle or tow of individual fibers. The fibers contained within the roving can be twisted or can be straight. Although different fibers can be used in a roving, it can be beneficial in some embodiments, if a roving contains a single fiber type to minimize any adverse impact of using fiber types having a different thermal coefficient of expansion. The number of fibers contained in each roving can be constant or vary from roving to roving and can depend upon the fiber type. A roving can include, for instance, from about 500 fibers to about 100,000 individual fibers, or from about 1,000 fibers to about 75,000 fibers, and in some embodiments, from about 5,000 to about 50,000 fibers.

The continuous fibers possess a high degree of tensile strength relative to their mass. For example, the ultimate tensile strength of the fibers can be about 3,000 MPa or greater. For instance, the ultimate tensile strength of the fibers as determined according to ASTM D639 (equivalent to ISO testing method 527) is typically from about 3,000 MPa to about 15,000 MPa, in some embodiments from about 4,000 MPa to about 10,000 MPa, and in some embodiments, from about 5,000 MPa to about 6,000 MPa. Such tensile strengths may be achieved even though the fibers are of a relatively light weight, such as a mass per unit length of from about 0.1 to about 2 grams per meter, in some embodiments from about 0.4 to about 1.5 grams per meter. The ratio of tensile strength to mass per unit length may thus be about 2,000 Megapascals per gram per meter ("MPa/g/m") or greater, in some embodiments about 4,000 MPa/g/m or greater, and in some embodiments, from about 5,500 to about 30,000 MPa/g/m.

The high strength fibers may be organic fibers or inorganic fibers. For example, the high strength fibers may be metal fibers (e.g., copper, steel, aluminum, stainless steel, etc.), basalt fibers, glass fibers (e.g., E-glass, A-glass, C-glass, D-glass, AR-glass, R-glass, S1-glass, S2-glass, etc.), carbon fibers (e.g., amorphous carbon, graphitic carbon, or metal-coated carbon, etc.), nanotubes, boron fibers, ceramic fibers (e.g., boron, alumina, silicon carbide, silicon nitride, zirconia, etc.), aramid fibers (e.g., Kevlar® marketed by E. I. duPont de Nemours, Wilmington, Del.), synthetic organic fibers (e.g., polyamide, ultra-high molecular weight polyethylene, paraphenylene, terephthalamide, and polyphenylene sulfide), polybenzimidazole (PBI) fibers, and various other natural or synthetic inorganic or organic fibrous materials known for reinforcing compositions. The materials used to form the fibers can include various additives as are known in the art, e.g., colorants, etc.

Carbon fibers are particularly suitable for use as the continuous fibers, which typically have a tensile strength to mass ratio in the range of from about 5,000 to about 7,000 MPa/g/m.

The continuous fibers can generally have a nominal diameter of about 2 μm micrometers or greater, for instance about 4 μm to about 35 μm (micrometers or microns), and in some embodiments, from about 5 μm to about 35 μm micrometers.

The continuous fibers are discharged in conjunction with the formation material during the formation of an individual layer of the additively manufactured product structure such that the continuous fiber is at least partially encased by the formation material. Any suitable method for combining the materials can be utilized, provided that the continuous fiber is adequately incorporated with the formation material and bonding between the two materials can occur. The type of bond formed between the continuous fiber and the formation material can depend upon the two materials involved. For instance a thermal bond, a chemical bond, a friction bond, an electrostatic bond, etc. can be formed between the two materials in order that the high strength continuous fiber is at least partially encased by the formation material and the two components will be effectively bonded to one another. In some embodiments, both the continuous fiber and the formation material may be sufficiently heated to promote admixing of the formation material and continuous fiber to form the composite material.

As will be appreciated from this disclosure, the continuous fiber may be any material having reinforcing characteristics. The continuous fiber may be formed of a plurality of fibers of either the same or differing materials. The formation material may be formed of one material or an admixture of multiple materials. Further, the print head may be configured to apply one or multiple coatings of formation material on the continuous fiber, either stacked on the other, overlapping or applied at different positions on the surface of the continuous fiber. Further, the print head could be configured to advance several different continuous fibers with different or the same formation materials, depending on the specifications required for formation of a work piece. In addition, the system could include multiple print heads configured to provide either the same or different print media to a work piece, so that different compositions of materials may be used to form the work piece. For example, some print heads could be configured to either advance different continuous fibers and/or formation materials to provide different composition materials to be selectively applied to the work piece. In further or alternative embodiments, some print heads may be configured to provide continuous fiber reinforced composite materials, while other print heads provide non-reinforced printing media to thereby provide a work piece that has selective reinforced sections.

Discharge of the continuous fiber from the print head can be achieved in different manners, depending on the application. In one embodiment, the continuous fiber may be advanced through the print head as part of an extrusion process, whereby the continuous fiber is "pushed" or urged through the print head. In this embodiment, the continuous fiber is engaged with a driving system, such as a motorized friction drive wheel(s) or a forced air system, to advance the continuous fiber through the print head. The continuous fiber enters an input orifice in the print head and is advanced toward the extrusion tip 14 of the nozzle 12. The formation material 16 is heated above the melting temperature of the formation material to soften and/or liquefy so as to flow through the extrusion tip 14 and form at least a partial coating on the continuous fiber 18, as the continuous fiber is advanced from the print head and onto the printing surface 22, a mandrel 32, and/or an existing work piece on the print bed 24. By movement of the print bed 24 and/or the mandrel relative to the print head, work pieces can be formed by additive application of the composite material 20 onto the printing surface 22, mandrel, and/or existing work piece.

As an alternative to advancing the continuous fiber by push or urging the fiber through the print head, the continuous fiber may be advanced by a pultrusion operation, whereby the continuous fiber is drawn or pulled from the tip of the nozzle. In this embodiment, the contact point of the composite material on the printing surface 22 of the print bed 24, an alternative mandrel 32 located on the print bed 24, and/or an existing work piece located on the print bed creates an anchor (e.g., a fixed, contact, gripping point, and the like) that allows for the composite material 20 to be pulled from the print head as the print bed 24, mandrel 32, and/or existing work piece is moved relative to the print head to form the finished work piece. In this embodiment, using the movement of the print bed and/or mandrel allows for precise control of the advancement of the composite material 20 from the print head.

Drawing or "casting on" of the composite material 20 onto the printing surface 22, mandrel 32 and/or existing work piece to begin the printing process can be accomplished by various methods. For example, the composite material 20 could be connected or adhered to a needle or other type structure that can draw the composite material from the print head and apply it to the printing surface, mandrel, and/or existing work piece. As an alternative, the nozzle of the print head may be brought into contact with the printing surface 22 of the print bed 24, the mandrel 32, and/or the existing work piece so as to contact the composite material 20, whereby either the composite material itself or the formation material 16 surrounding the continuous fiber 18 in the melted state adheres to the printing surface 22, mandrel 32, and/or the existing work piece creating an anchor for pulling the composite material 20 from the print head.

The rate of advancement of the continuous fiber through the print head, the temperature of the formation material, and/or in some instances, the temperature of the printing surface 22 of the print bed 24, the mandrel 32, and/or the existing work piece on the print bed require some level of control to ensure that the continuous fiber 18 receives a consistent/desired coating and that the composite material 20 is applied to either the printing surface 22, mandrel 32, and/or existing work piece in a manner to adhere to same. For example, the temperature of the formation material 16 and the rate of movement of the print bed and/or mandrel may be controlled to ensure that the composite material 20 is applied in a manner to allow for proper adherence of the composite material 20 to the printing surface 22, mandrel 32, and/or existing work piece. In some instances, the printing surface and/or the mandrel and/or the existing work piece on which the composite material 20 is applied can also or alternatively be temperature controlled for this purpose. In general, the rate of application and temperature of the formation material 16 on the continuous fiber 18 are controlled to ensure that the coating is applied in a desired manner on the continuous fiber and that the composite material 20 is drawn from the print head is a consistent manner.

Tensioning of the composite material may also be required for proper advancement onto the printing surface, mandrel, and/or existing work piece. Tensioning systems can take many forms and be located at different positions in the process to provide proper tensioning of the continuous fiber and/or the composite material. For example, a spool maintaining the continuous fiber could be fitted on a tensioning system, such as a rotational break or clutch that impedes rotation of the spool as continuous fiber is meted from the spool to provide tensioning. Similarly, the print head may include a tensioning system, such as restrictive pulleys, clutch, friction element or the like to apply tension to the continuous fiber.

It is also contemplated that the proposed printer could be equipped to perform both "push" and pultrusion of the continuous fiber to advance the continuous fiber through the print head. In this embodiment, there may be drive means associated with the print head to advance the continuous fiber through the print head assisted by a pulling effect of the movement of the print bed, mandrel, and/or existing work piece on the composite material as it is advanced.

As mentioned above, in some embodiments, the composite material 20 may be applied to a mandrel, where the mandrel operates as a form, support and/or pattern of the work piece to be manufactured from the composite material 20. The mandrel aids in shaping of the work piece being printed as the composite material is applied to the mandrel. After printing is complete, and the printed work piece has at least partially cured, the mandrel can be removed from the work piece, such as by eroding, dissolving, breakings, shrinking, or other contemplated procedures for removing either portions of or the entire mandrel.

The above description discloses an embodiment of the system that incorporates both a print head capable of advancing a continuous fiber and a print bed that is moveable with six degrees of freedom. It is understood, however, that embodiments are contemplated whereby a print head capable of advancing a continuous fiber may be incorporated into a system that comprises a stationary print bed. Alternatively, embodiments are contemplated whereby a system is employed that includes a print bed that is moveable with six degrees of freedom in combination with a traditional 3D print head that does not advance a continuous fiber.

EXAMPLES

A prototype set-up was developed that includes a 6 degrees of freedom robot with integrated industrial level controls to operate the extruder (print head), hotbed and temperature sensors. Integration of hardware and software has been achieved. A KUKA KR6 based robotic system was developed to print thin walled continuous carbon reinforced ULTEM ducting for use in vehicles. The system allows printing of carbon fiber reinforced ULTEM of thin walled ducts with fibers printed not only in the plane of the cross-section of the duct but also in directions with angles with respect to the cross-sectional plane. This is in contrast to current 3D printing systems based on printing layer by layer and therefore allowing only fibers in the cross-sectional plane. The system may offer seven (7) degrees of freedom (3 translations and 3 rotations related to the robot and 1 degree of freedom imparted by a separate mandrel). The system is fed with a material system compliant to the Fire, Smoke and Toxicity (FST) requirements specified by FAA and EASA. The system has multiple printing heads to be able to print parts that are designed to be built from a combination of unreinforced, chopped fiber reinforced and continuous fiber reinforced materials. In addition a printing head is supplied able to print support material that can be removed after printing. This support material serves as an optional stabilizer for long, thin walled parts.

The 3D printer is particularly suitable for printing ready-for-use duct work, conduit, tubing, piping, channeling, hollow-chambered structures and other similar structures by addressing the stiffness and strength shortcomings that would be associated with forming these parts with a conventional 3D printing technique, which would provide unreinforced polymer 3D printed parts. As an example, the provided 3D printer can be used in applications to print thin-walled, complex shaped parts, which, heretofore could only be manufactured in a complex, multi-step process. Thus, the provided 3D printer and processes allows the 3D printing of multi-axial composite parts with multiple degrees of print freedom, opening the possibility of printing high performance parts with the continuous fiber reinforcement creating the required stiffness and strength.

In some embodiments a continuous composite filament may be used as the continuous fiber. The composite filament allows for formation of work pieces having a complicated shape that can incorporate continuous filaments in multiple directions and orientations, which can lead to the production of stronger and more useful composite structures. In particular, the composite filaments can combine the strength and stiffness of continuous filaments (e.g., carbon tows) with the formation flexibility of additive manufacturing formation materials to provide a composite filament capable of successful deposition according to an additive manufacturing process.

The composite filament as described herein is particularly suitable for use as a continuous fiber for the formation of structures for use in high performance environments, e.g., environments operating under high thermal, chemical, and/or mechanical stresses. Examples of encompassed products commonly found in such environments can include, without limitation, duct work, conduit, tubing, piping, channeling, hollow-chambered structures and other similar structures. In such high performance embodiments, the composite filaments can include a high-strength continuous filament in conjunction with a high performance polymer, and in one particular embodiment with a thermoplastic polymer that exhibits a high glass transition temperature. Such composite filaments can be utilized in an additive manufacturing process and address the stiffness, strength, and environmental performance shortcomings (e.g., thermal resistance) that would be associated with forming such parts with conventional techniques and materials. For instance, conventional additive manufacturing techniques can provide only unreinforced polymer parts. As an example, the composite filaments can be used in applications to 3D print thin-walled, complex-shaped reinforced parts that heretofore could only be manufactured in a complex, multi-step process. Thus, the composite filaments can allow the formation of continuous filament reinforced composite parts having complicated geometries and exhibiting high performance characteristics formed according to an additive manufacturing process.

Figure 2:
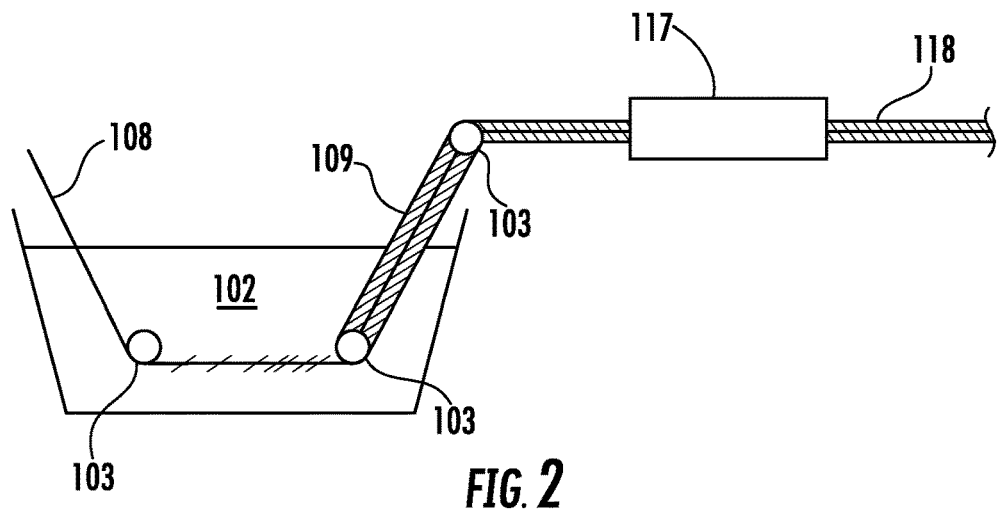
FIG. 2 illustrates a method for forming a composite filament as described herein.

FIG. 2 schematically illustrates one method for forming a composite filament usable as a continuous fiber in the additive manufacturing process described herein. The method can include immersing a continuous filament 108 into a solution 102 that includes a polymer in a dissolved state and a solvent for the polymer.

While the composite filaments can incorporate any continuous filament 108 as is known in the art, in particular embodiments the continuous filament 108 can be a high strength, high performance continuous filament. The high strength continuous filament 108 can be utilized as an individual filament (e.g., as a porous or shaped filament that can be permeated with the polymer solution) or as a bundle of individual filaments or filaments, e.g., a roving. As used herein, the term "roving" generally refers to a bundle of generally aligned individual filaments and is used interchangeably with the term "tow." The individual filaments contained within the roving can be twisted or can be straight and the bundle of individual filaments can be twisted about one another or generally parallel continuous filaments with no intentional twist to the roving. Although different filaments can be used in a roving, it can be beneficial in some embodiments to utilize a roving that contains a plurality of a single filament type, for instance to minimize any adverse impact of using filament types having a different thermal coefficient of expansion. The number of filaments contained in a roving can be constant or vary from one portion of the roving to another and can depend upon the material of the filament. A roving can include, for instance, from about 500 individual filaments to about 100,000 individual filaments, or from about 1,000 individual filaments to about 75,000 individual filaments, and in some embodiments, from about 5,000 individual filaments to about 50,000 individual filaments.

The continuous filament 108 can possess a high degree of tensile strength relative to the mass. For example, the ultimate tensile strength of a continuous filament 108 can be about 3,000 MPa or greater. For instance, the ultimate tensile strength of a continuous filament 8 as determined according to ASTM D639 (equivalent to ISO testing method 527) is typically from about 3,000 MPa to about 15,000 MPa, in some embodiments from about 4,000 MPa to about 10,000 MPa, and in some embodiments from about 5,000 MPa to about 6,000 MPa. Such tensile strengths may be achieved even though the filaments are of a relatively light weight, such as a mass per unit length of from about 0.1 to about 2 grams per meter, in some embodiments from about 0.4 to about 1.5 grams per meter. The ratio of tensile strength to mass per unit length may thus be about 2,000 Megapascals per gram per meter ("MPa/g/m") or greater, in some embodiments about 4,000 MPa/g/m or greater, and in some embodiments, from about 5,500 to about 30,000 MPa/g/m.

A continuous filament 108 may be an organic filament or an inorganic filament. For example, a continuous filament 108 may include a metal (e.g., copper, steel, aluminum, stainless steel, etc.), basalt, glass (e.g., E-glass, A-glass, C-glass, D-glass, AR-glass, R-glass, S1-glass, S2-glass, etc.), carbon (e.g., amorphous carbon, graphitic carbon, or metal-coated carbon, etc.), nanotubes, boron, ceramics (e.g., boron, alumina, silicon carbide, silicon nitride, zirconia, etc.), aramid (e.g., Kevlar® marketed by E. I. duPont de Nemours, Wilmington, Del.), synthetic organics (e.g., polyamide, ultra-high molecular weight polyethylene, paraphenylene, terephthalamide, and polyphenylene sulfide), polybenzimidazole (PBI) filaments, and various other natural or synthetic inorganic or organic materials known for forming fibrous reinforcing compositions. However, the continuous filament should be formed of materials having a melting temperature greater than the deposition temperature of the additive manufacturing process in which the composite filaments will be used and greater than the thermoplastic polymer that will be combined with the continuous filament in forming the composite filament. The materials used to form the filaments can include various additives as are known in the art, e.g., colorants, etc.

Carbon filaments are particularly suitable for use as the continuous filaments in one embodiment. Carbon filaments can typically have a tensile strength to mass ratio in the range of from about 5,000 to about 7,000 MPa/g/m.

The continuous filaments can generally have a nominal diameter of about 2 micrometers or greater, for instance about 4 to about 35 micrometers, and in some embodiments, from about 5 to about 35 micrometers.

Referring again to FIG. 2, a continuous filament 108 can be immersed in a solution 102 that includes a polymer dissolved in a solvent. For instance, the continuous filament 108 can be pulled through a bath of the solution by use of a series of rollers 103, as shown. While the composite filament can generally incorporate any polymer that may be successfully associated with the continuous filament 108, in one embodiment the polymer can be a high performance thermoplastic polymer or a thermoset polymer. High performance polymers as may be incorporated in the composite filament can include, without limitation, amorphous thermoplastics such as polysulfone (PSU), poly(ethersulfone) (PES), and polyetherimide (PEI), as well as semi-crystalline thermoplastics such as poly(phenylene sulfide) (PPS), polyaryl ether ketones (PAEK) including polyether ketones (PEK) and polyetheretherketone (PEEK), partly aromatic polyamides such as polyphthalamide (PPA), liquid-crystalline polymers (LCP), polyphenylene sulfones (PPSU), as well as blends and copolymers of thermoplastics.

Suitable thermoset polymers can include, without limitation, epoxy resins, silicone resins, polyimides, phenolformaldehyde resin, diallyl phthalate, as well as combinations of materials. It will be understood by one of ordinary skill in the art that when considering utilization of a thermoset polymer in formation of the composite filament, it may be beneficial to encourage final cure of the polymer following the additive manufacturing process, so as to improve consolidation of the composite filament in the manufactured structure.

In one particular embodiment, a thermoplastic polymer that exhibits a high glass transition temperature ($T_g$) can be incorporated in the composite filament. For instance, a thermoplastic polymer having a glass transition temperature of about 150° C. or greater can be dissolved in the solution 2. Exemplary high $T_g$ polymers can include, without limitation, polyethyleneimine ($T_g$=215° C.), PEI ($T_g$=217° C.), polyamide-imide ($T_g$=275° C.), polyarylate ($T_g$=190° C.), PES ($T_g$=210° C.-230° C.), polyimide ($T_g$=250° C.-340° C.), polyphenylene ($T_g$=158° C.-168° C.), and amorphous thermoplastic polyimide ($T_g$=247° C.). Other examples of high $T_g$ polymers include those that contain one or more of the following monomers (listed along with a published $T_g$ for the homopolymer): 2-vinyl naphthalene ($T_g$=151° C.), 2,4,6-trimethylstyrene ($T_g$=162° C.), 2,6-dichlorostyrene ($T_g$=167° C.), vinyl carbazole ($T_g$=227° C.), vinyl ferrocene ($T_g$=189° C.); acenaphthalene ($T_g$=214° C.), and methacrylic acid anhydride ($T_g$=159° C.).

The solution can include a solvent for the polymer, which can encompass organic or aqueous solvents, as determined according to the characteristics of the polymer. For instance, a solution can include PEI in solution with a suitable solvent, e.g., methanol, ethanol, or chloroform, as is known in the art. The solution can generally include the polymer in an about of about 20 wt. % or less, for instance about 10 wt. % or less in some embodiments.

As illustrated in FIG. 2, as the continuous filament 108 is pulled or otherwise immersed in the solution 102, the filament 108 can pick up polymer contained in the solution to form a wet composite filament 109. Following, the wet composite filament 109 can be dried to remove the solvent and form the composite filament 118. For instance, the wet composite filament 109 can be dried through application of energy, e.g., through use of a dryer 107.

Figure 3:
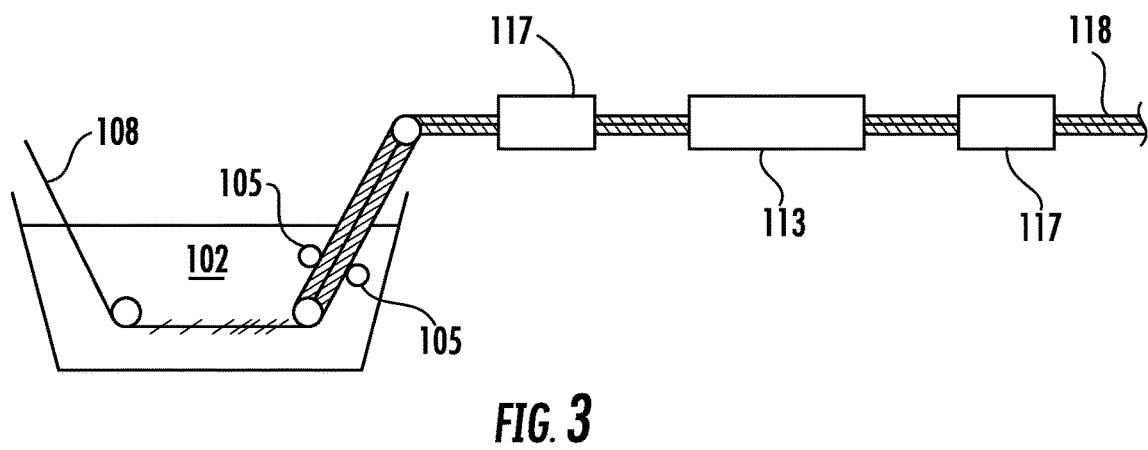
FIG. 3 illustrates another method for forming a composite filament as described herein.

The composite filament formation process can include additional formation steps in some embodiments. For instance, as illustrated in FIG. 3, a process can include a series of nip rolls 5 or the like that can improve impregnation of the dissolved polymer into the filament 8.

In one embodiment, a formation process can include a die 113 through use of which the composite filament 118 can be further formed or molded. For instance, the initially formed composite filament 118 can be fed through a die 113 to mold the filament and modify the cross-sectional shape of the composite filament 118 and provide a particular and/or more consistent shape to the composite filament 118. Depending upon the nature of the die 113, it may prove beneficial to incorporate a second dryer 107 or the like downstream of the die 113.

Figure 4:
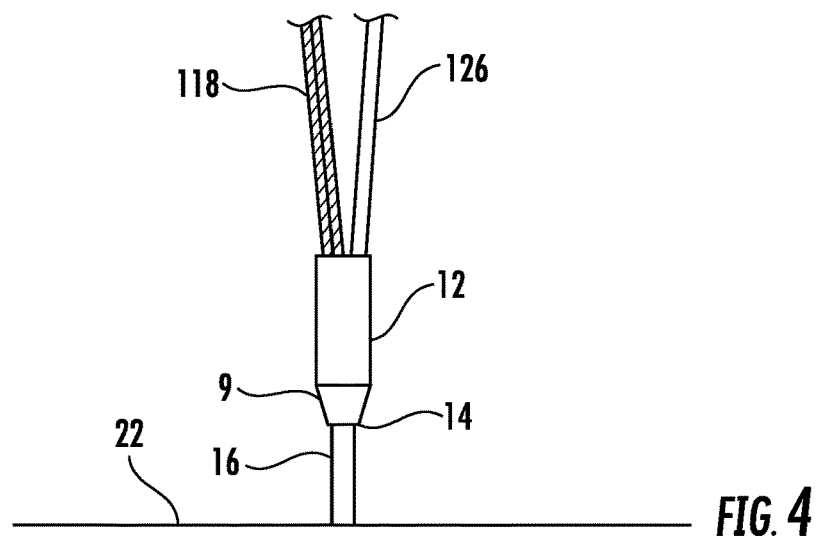
FIG. 4 illustrates an additive manufacturing method incorporating a composite filament as described herein.

FIG. 4 illustrates one embodiment of an additive manufacturing process as may be utilized to form a structure incorporating the continuous composite filament is the continuous fiber and is similar to the embodiment of FIGS. 1A-1D. As shown, the composite filament 118 can be combined with a formation material 126. In this embodiment, the formation material 126 can be provided to a print head 112 in the form of a second filament. For instance, the formation material 126 can be a metal, a polymeric material, etc. that is fed to the print head 112 and is heated above the melting temperature of the formation material 126 to soften and/or liquefy so as to be combined with the composite filament 18 within the print head 112. The composite filament 118 is likewise heated to a temperature above the melting temperature of the polymer of the composite. Upon combination of the formation material 126 with the composite filament 118 within the print head 112, the formation material 126 can blend and/or bond with the polymer of the composite filament 118 and the formation material 126 can form a partial or continuous coating on the composite filament 18 to form the composite material 116. The composite material 116 thus formed can pass through the extrusion tip 114 to the printing surface 122.

The formation material may be formed of one material or an admixture of multiple materials. The formation material 126 can be, for example, a gel, a high viscosity liquid, or a formable solid that can be extruded in the desired pattern. Formation materials likewise can be organic or inorganic. Formation materials can include, without limitation, polymers including thermoplastic polymers or thermoset polymers (e.g., polyolefins, polystyrenes, polyvinyl chloride, elastomeric thermoplastics, polycarbonates, polyamides, etc.), eutectic metal alloy melts, clays, ceramics, silicone rubbers, and so forth. Blends of materials can also be utilized as the formation materials, e.g., polymer blends. The formation materials can include additives as are generally known in the art such as, without limitation, dyes or colorants, flow modifiers, stabilizers, nucleators, flame retardants, and so forth.

In one particular embodiment, the formation material 126 can include the same polymer as the polymer of the composite filament 18. For instance, the composite filament 118 can include a continuous filament and a high Tg thermoplastic polymer, such as PEI, and the formation material 126 can likewise include PEI. This can improve blending and bonding of the materials in the print head in formation of the composite material 116.

The composite material 116 can be discharged from the print head 112 onto surface 22 during the formation of an individual layer of an additively manufactured product structure. Any suitable method for combining the composite filament 118 and the formation material 126 can be utilized, provided that the continuous filament of the composite filament 18 is adequately incorporated with the formation material 126 following deposition. The type of bond formed between the composite filament 18 and the formation material 126 can depend upon the materials involved. For instance a thermal bond, a chemical bond, a friction bond, an electrostatic bond, etc., as well as combinations of bond types can be formed between the continuous filament and the polymer of the composite filament 118 and between either or both of these components of the composite filament 118 and the formation material 126 in order that the components will be effectively bonded to one another.

Figure 8:
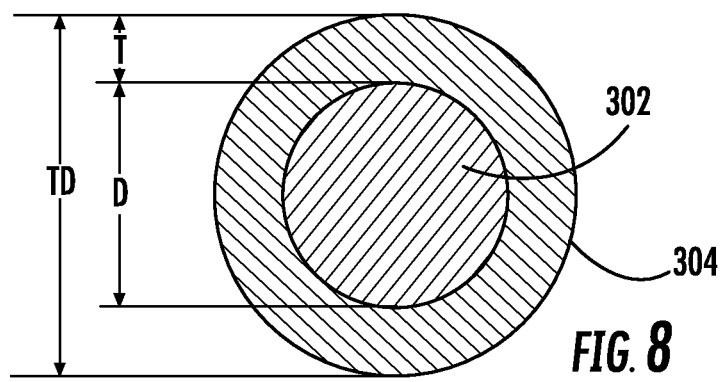
FIG. 8 is a section view of a continuous fiber and composite material as it exits the nozzle prior to formation of the fiber reinforced part.
Figure 9:
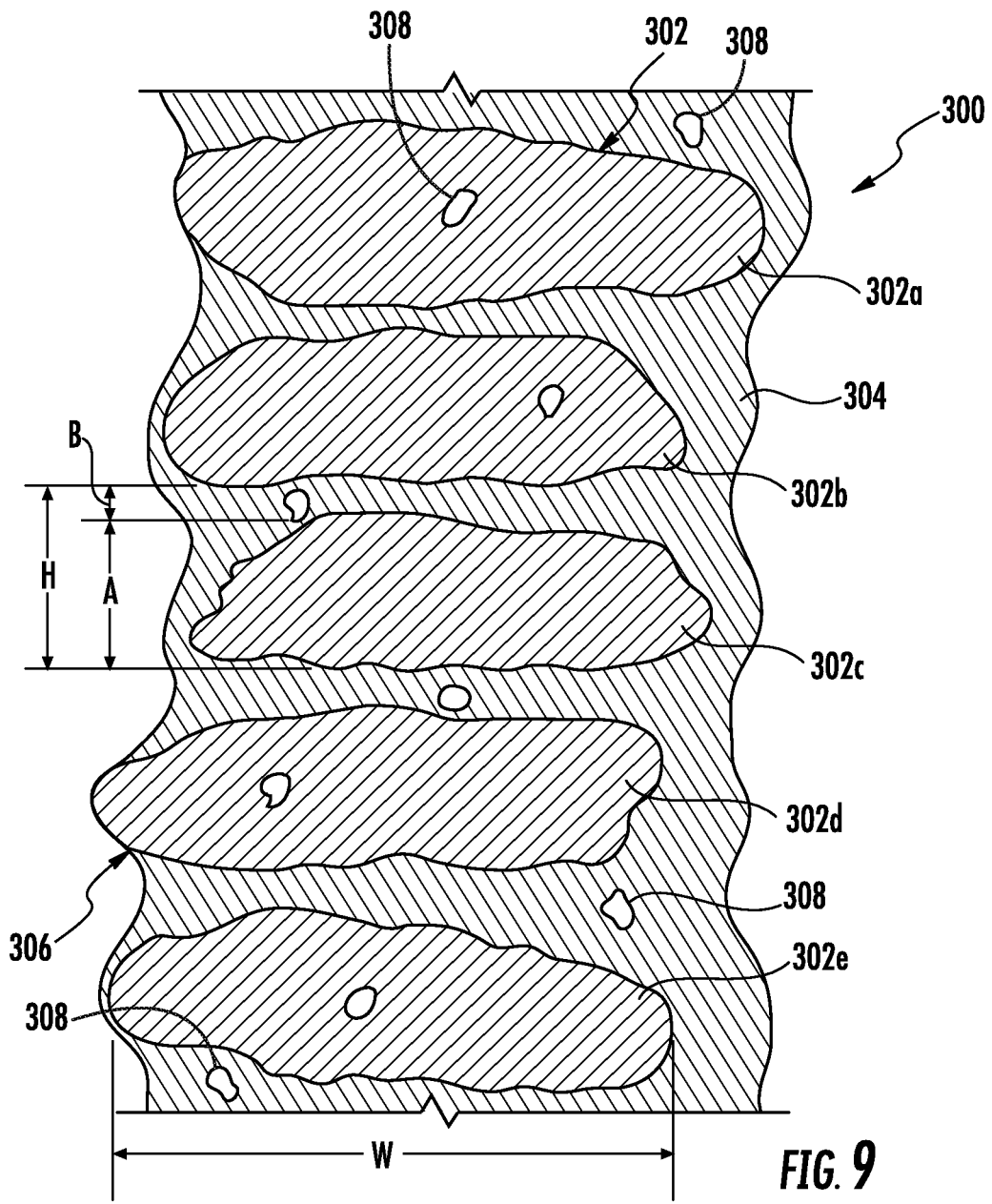
FIG. 9 is a magnified section view of another exemplary embodiment of a 3D printed fiber reinforced part.
Figure 10:
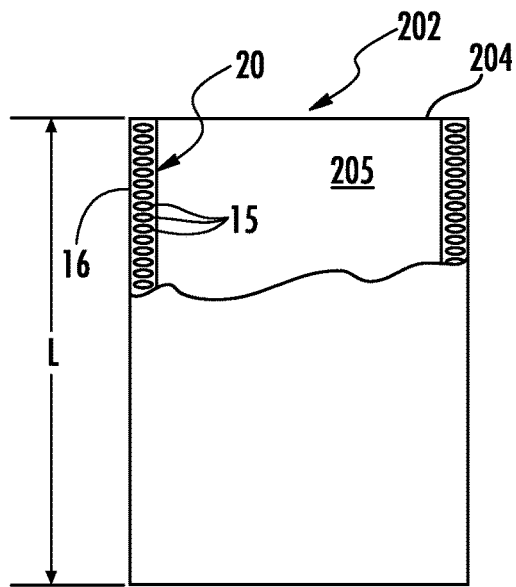
FIGS. 10 and 14 are partial section views of still other exemplary embodiments of a 3D printed fiber reinforced part.

Various embodiments of a 3D-printed fiber reinforced part 202 are shown in FIGS. 5 through 7. In one embodiment the part 202 comprises a relatively thin-walled generally tubular member suitable for use as a duct or other conduit. The material of the part 202 comprises a composite material including a formation material and a continuous fiber (FIGS. 8-10). The parts shown and described herein may be advantageously made by the processes, devices and systems described above.

Figure 11:
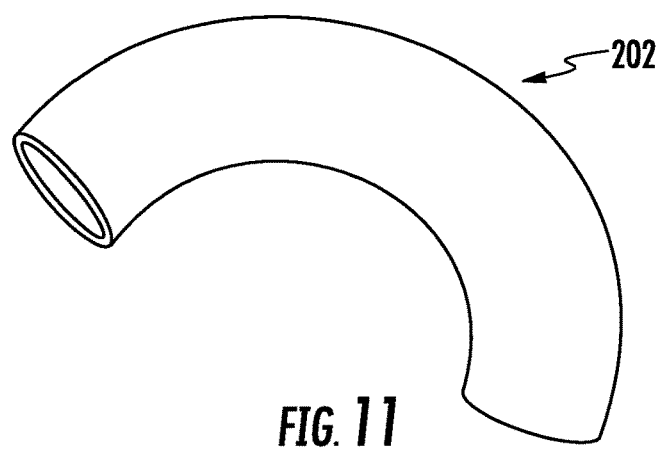
FIGS. 11, 12 and 15 are perspective views of exemplary embodiments of a 3D printed fiber reinforced part.
Figure 12:
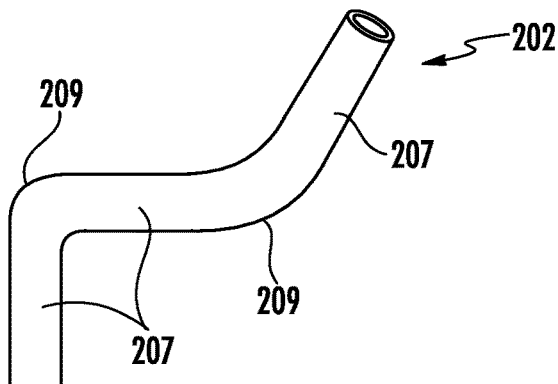

In some embodiments, the part 202 has a relatively thin-walled construction having a generally tubular shape. In one embodiment the part 202 is a duct such as an air duct suitable for use in aircraft although the duct may be used in any application or device. The part 202 may also be a pipe, conduit, sheath or the like. The part 202 may be produced in any suitable length L. In one embodiment the tubular part comprises a substantially enclosed wall 204 defining a generally hollow interior 205 that is open at either end. While the wall 204 is generally closed openings may be formed in wall 204. Moreover, the interior 205 may be closed at one or both ends. The wall 204 may have a generally annular or circular shape in cross-section as shown in FIGS. 5 and 7. In other embodiments the part may have other cross-sectional shapes such as, but not limited to, oval, rectangular, polygon, ellipse, stadium (FIG. 6) or the like. Moreover, a single part may have a cross sectional shape that varies in shape and/or dimensions over its length L. For example, as shown in FIG. 7 the part 202 tapers from a larger diameter to a smaller diameter over its length. The term "tubular" as used herein means any relatively thin walled member having a substantially closed wall defining a generally hollow interior that defines a cavity or passage regardless of the cross-sectional shape of the wall. The cross-sectional dimensions of the part 202 and the thickness of the wall 204 may vary. Moreover, while part 202 is shown as being relatively straight in the length L direction, the part 202 may be curved (FIG. 11) or be formed with linear sections 207 connected at curved or angled elbows 209 (FIG. 12).

Figure 13:
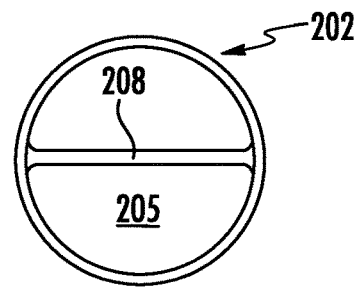
FIG. 13 is an end view of another exemplary embodiment of a 3D printed fiber reinforced part.
Figure 14:
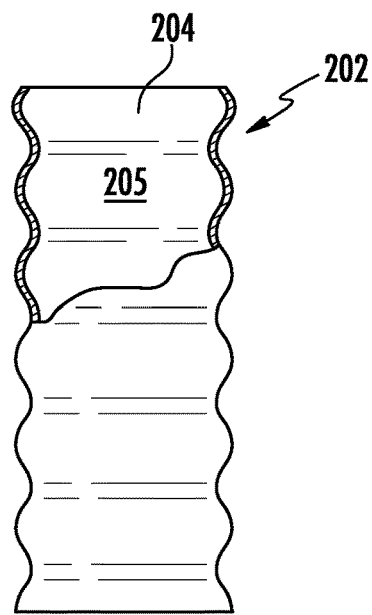
Figure 15:
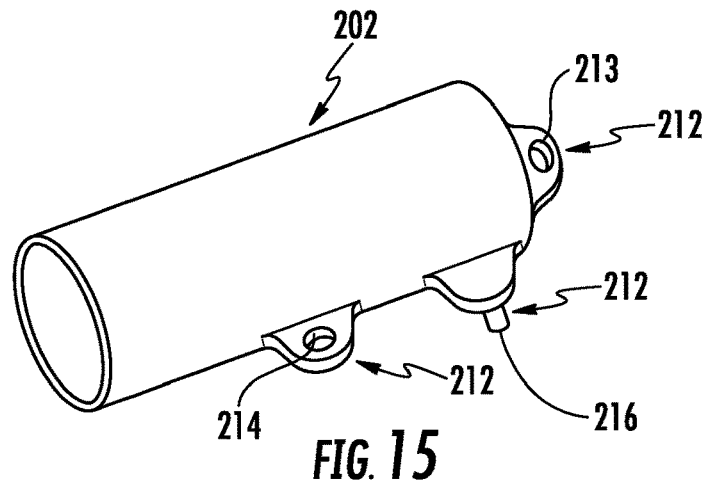

While the interior is generally hollow the interior may comprise reinforcement members or braces 208 in the interior space 205, FIG. 13. Moreover, while the wall is shown as having a generally planar surface in cross-section, the wall may have surface variations such as a corrugated, ribbed or other surface, FIG. 14. Moreover the exterior surface or the interior surface of the wall may be formed with integral connection mechanisms 212 for connecting the member to a support surface or other structure, FIG. 15. The connection mechanisms 212 may comprise flanges or similar extensions defining through holes 213, threaded holes 214, grooves, or other openings for receiving separate fasteners. The connection mechanisms may also be formed as threaded members, posts, flats, snap-fit connectors or other structures 216 for engaging mating structures on another, part, structure, surface or the like. Because the part 202 is made by a 3D printing process as described above, the braces 208 and connection mechanisms 212 may be formed integrally with the part 202 in a one-piece unitary part.

Figure 16:
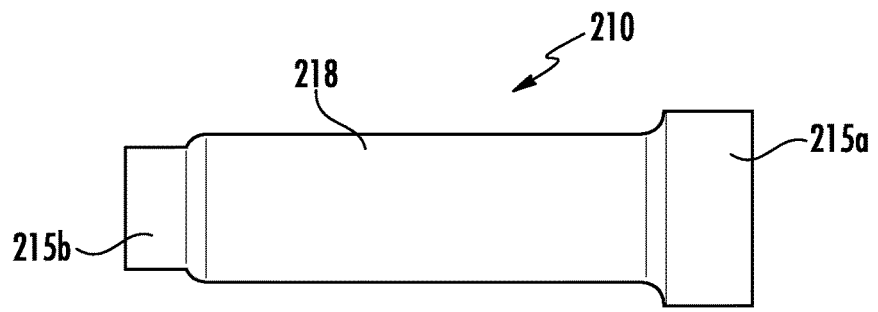
FIG. 16 is a side view of another exemplary embodiment of a 3D printed fiber reinforced part.

A fitting or connection part 210 for connecting two or more of the parts 202 is shown in FIG. 16. The fitting 210 may comprise a generally tubular member having a coupling section 215a, 215b formed at one or both ends of a body portion 216. The coupling section 215a, 215b is configured to closely receive or be closely received in the end of a tubular part 202. The shape of the coupling section 215a, 215b may be the same shape as the end of the tubular part 202 to which it is attached and may have internal dimensions that are slightly larger than the external dimension of the tubular member 215a or external dimensions that are slightly smaller than the internal dimension of the tubular member 215b such that the tubular part 202 and coupling section 215a, 215b are in close engagement with one another over their entire periphery. The body portion 214 of the fitting may have a different cross-sectional shape and/or size than the coupling sections 215a, 215b or the tubular part 202 to which the fitting is attached. Any of the tubular parts 202 may be provided with the coupling sections 215a, 215b such that the tubular members may be connected directly to one another. The fittings 210 and tubular parts 202 may be joined together using a friction fit, adhesive, chemical bonding, melt, solder, welding, mechanical fastener or other connector. While the examples shown herein are of a general tubular nature, it is understood that other shapes/configurations are possible and that these are only examples. For example, the part could be a closed or partially enclosed container having an inner chamber surround by side, top, and bottom walls, with or without one or more openings.

To more clearly describe the structure of a part made as described above reference is made to FIGS. 8 and 9. FIG. 8 shows a cross-section of a composite material as it is discharged from the nozzle during the formation process. The composite material comprises a continuous fiber 302 encased in a formation material 304 as previously described. The continuous fiber 302 exits the print head with a substantially circular cross-section and is substantially uniformly encased in the formation material 304 such that the layer of formation material, as it is discharged from the nozzle, has a substantially annular shape in cross-section. While the fiber has a generally circular cross section and the formation material has a generally annular cross-section, it will be appreciated that both the fiber and surrounding layer of formation material have surface irregularities and do not form perfect geometric shapes. Moreover, in some embodiments the fiber may have other than a circular cross-section.

In one example embodiment, the diameter D of the fiber may be in the range of 500 to 800 µm (micron). The total diameter TD of the fiber encased in formation material may be in the range of 800 to 1200 µm. These ranges may be adjusted to whatever is desired for a particular product. The thickness T of the layer of formation material may be in the range of 0 to 400 µm on the radius and in some embodiments may be in the range of 0-200 µm. The ranges may be altered by adding more polymer and increasing the nozzle diameter. For example in one sample extrusion a product was printed with a 2 mm nozzle that effectively extruded a 2 mm diameter layer. Because the diameter D of the fiber and the thickness T of the formation material layer may vary slightly over the length of the discharged composite material the dimensions provided above may be considered average dimensions of the composite material as discharged from the nozzle.

During the application of the continuous fiber and composite material as the part is manufactured, the continuous fiber and the formation material may be deformed and may take on more of an ellipsoidal shape in cross-section, such as shown in FIG. 9, in the finished part. The deformation of the composite material is due to the fiber and formation material being heated to a pliable state, the pressure used to apply the fiber during the manufacturing process and the effects of gravity. As can be seen from FIG. 9, the more the continuous fiber and formation material are compressed, the more contact surface that is created between adjacent layers of the fibers. The temperature and the pressure with which the continuous fiber is applied to the part can be controlled to thereby control the contacting surface area of each layer of fiber in the part, with areas having fibers with increase contact surface having better adherence to adjacent layers.

FIGS. 8 and 9 shows a partial cross-section of an exemplary part magnified to show the details of the internal structure of the part. It is to be understood that the part as shown in FIG. 9 is magnified on the order 100 times (×100) so as to visibly show the structure in cross-section. Moreover, FIGS. 8 and 9 are simplified drawings of the composite material and the part as they would actually appear in magnified cross-section where microscopic surface irregularities have been omitted from the drawing. In actual magnified cross-section the surfaces of the constituent components would show surface irregularities, rough edges, imperfections and the like.

FIG. 9 shows a cross-section of a printed part 300 where the composite material 306 comprises a continuous fiber 302 encased within the formation material 304. In viewing FIG. 9, it must be understood that this is a particular cross-section of a particular section of a part. In general, regarding dimensions, these vary in accordance to the type of geometry being printed, layer heights and formation layer to filament ratio, etc. For example, the cross-section in FIG. 9 is taken from a cross-section of a curved surface of the part, as opposed to a straight section of the part. Due to this curvature, there is a difference in the amount of formation material on the left side of the cross-section compared to the right side. This is due to the curve from where the cross section was taken. For straight sections, it is more uniform, but it may be affected by a previous curve in the part. The thickness of formation material on the surface of the part can range from close to 0 mm to approaching 1 mm depending on the configuration of the part.

Further in viewing FIG. 9, while the continuous fiber 302 is shown as a series of sections 302a-302e it is to be understood that the sections form part of a single continuous fiber 302 where the plurality of sections result from the continuous fiber being cut along the section line of the drawing. The fiber is continuous in that the fiber is continuously deposited with the formation material during the 3D printing process and extends through and along each layer of the reinforced part. As a result the continuous fiber creates a continuous or substantially continuous reinforcement strand that extends in a substantially uninterrupted manner through the reinforced part. The fiber 302 may comprise a roving of fibers or a single fiber as previously described. The continuous fiber 302 is bonded to the formation material 304 by any suitable bond as previously described and may include a thermal bond, a chemical bond, a friction bond, an electrostatic bond etc. or combinations of such bonds. In some embodiments, both the continuous fiber and the formation material may be sufficiently heated to promote admixing of the formation material and the continuous fiber to form the composite material. The continuous fiber 302 is at least partially encased, and in some embodiments is completely encased, by the formation material 304 to create the composite material 306 that forms part 300.

As the continuous layers of composite material are layered against one another, on top of one another as viewed in FIG. 9, the composite material is deformed and the formation material of one layer adheres to the formation material of the adjacent layer. The composite material is cured or solidified to create a single solid structure having the desired shape.

In one embodiment the continuous fiber, in the finished part, has a width W of between approximately 1800 µm (micron) and 3200 µm where the width W is the dimension of the fiber in transverse cross-section. The distance between the bottom edge of one fiber and the bottom edge of the adjacent fiber or the height H of one layer (including the layer of formation material that is disposed between the adjacent fiber portions) is between approximately 800 µm and 1300 µm. The height H of a layer is composed of the thickness of the fiber (A) and the thickness of the formation layer (B) between the fiber layers. In one embodiment the thickness of the fiber (A) may be equal to or less than 800 µm and the thickness of the formation layer (B) between the fiber layers may be between 0 µm and 500 µm. These dimensions can also be readily adjusted. Under the right temperature parameters and flow rates, the extruder layer would be squeezed to the sides allowing for thin and wide layers. The volumetric flow rate may be altered to obtain better layer adhesion or improve the formation of complex curves The thickness of the formation material 304 over the fiber 302 on the exposed surfaces of the part vary based on the configuration of the part or portion of the part. For example, for a straight section of a part the thickness of the formation material 304 over the fiber 302 on the exposed surfaces of the part on the opposite sides of the part is approximately uniform. For a curved part the formation material 304 over the fiber 302 on the exposed surfaces of the part on the concave surface may be thicker than the formation material 304 over the fiber 302 on the exposed surfaces of the part on the convex surface. The thickness of the formation material 304 over the fiber 302 on the exposed surfaces of the part is also affected by the geometry of the adjacent curve. The thickness of the formation material on the exposed surfaces of the part may vary from near 0 to 0 µm to approaching 1 µm.

In one embodiment, the fiber volume may be approximately 23% of the total volume of the part. The void volume may be approximately 18% of the total volume of the part. The formation material may be approximately 59% of the total volume of the part. It is desirable to maintain a constant fiber volume throughout the part and to minimize the void volume. The fiber volume ratio and the void volume ratio do not signify the dimension, but it does provide critical information for the quality of the print. In general, it is desired to maintain a fairly constant fiber volume ratio and reduce the void volume ratio to a minimum. The ratio of formation material to fiber may be varied to change the appearance and structural characteristics of the part.

Some of the description herein is also provided in the three below patent applications, which are expressly incorporated herein by reference: 1) U.S. Provisional Application No. 62/209,573, filed Aug. 25, 2015, entitled "Integrated Robotic 3D Printing System for Printing of Fiber Reinforced Parts"; 2) U.S. patent application Ser. No. 15/246,781, filed Aug. 25, 2016, entitled "Integrated Robotic 3D Printing System for Printing of Fiber Reinforced Parts"; and 3) U.S. Provisional Patent Application No. 62/340,755, filed May 24, 2016, entitled "Composite Continuous Filament for Additive Manufacturing".

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

The invention claimed is:

1. A part comprising:
 a continuous fiber substantially encased in a formation material, the continuous fiber and formation material being arranged in a plurality of alternating layers such that the formation material of a first one of the alternating layers adheres to the formation material of a second one of the alternating layers over a length of the continuous fiber.

2. The part of claim 1 wherein the part comprises a walled, hollow member.

3. The part of claim 1 wherein the part comprises a walled, hollow member with openings at opposed ends of said walled hollow member to thereby form a duct.

4. The part of claim 1 wherein the continuous fiber extends uninterrupted along a length of the part.

5. The part of claim 1 wherein the continuous fiber has a width of between approximately 1800 µm and 3200 µm.

6. The part of claim 1 wherein a distance between a first edge of one layer and a first edge of an adjacent alternating layer of the part is less than or equal to approximately 800 µm.

7. The part of claim 1 wherein a thickness of the formation material encasing the continuous fiber is between approximately 0 µm to approximately 1 µm as measured from a surface of the continuous surface to an opposed surface of the formation material.

8. The part of claim 1 wherein a fiber volume of the continuous fiber is approximately 23% of a total volume of the part.

9. The part of claim 1 wherein the formation material is approximately 58% of a total volume of the part.

10. A duct comprising:
 a wall having a first end and a second end and defining a hollow interior, the wall comprising a continuous fiber extending from the first end to the second end substantially encased in a formation material, the continuous fiber and formation material being arranged in a plurality of alternating layers such that the formation material of a first one of the alternating layers adheres to the formation material of a second one of the alternating layers over a length of the continuous fiber.

11. A part comprising a continuous fiber prepared by an additive manufacturing process comprising the steps of:
 depositing a continuous fiber substantially encased in a formation material on a print bed using a print head; and
 moving the print head and/or the print bed during the depositing of the composite material, such that the continuous fiber and formation material are arranged in a plurality of alternating layers such that the formation material of a first one of the alternating layers adheres to the formation material of a second one of the alternating layers over a length of the continuous fiber.

12. The part of claim 11 wherein the part comprises a walled, hollow member.

13. The part of claim 11 wherein the part comprises a walled hollow member with openings at opposed ends of said walled, hollow member.

14. The part of claim 11 wherein the formation material of one layer adheres to the formation material of an adjacent alternating layer of the part.

15. The part of claim 11 wherein the continuous fiber has a width of between approximately 1800 µm and 3200 µm.

16. The part of claim 11 wherein a distance between a first edge of one layer and a first edge of an adjacent alternating layer of the part is less than or equal to approximately 800 µm.

17. The part of claim 11 wherein a thickness of the formation material encasing the continuous fiber is between approximately 0 µm to approximately 1 µm as measured from a surface of the continuous surface to an opposed surface of the formation material.

18. The part of claim 11 wherein a fiber volume of the continuous fiber is approximately 23% of a total volume of the part.

19. The part of claim 11 wherein the formation material is approximately 59% of a total volume of the part.

* * * * *